US007369729B2

(12) United States Patent
Saito et al.

(10) Patent No.: US 7,369,729 B2
(45) Date of Patent: May 6, 2008

(54) OPTICAL FIBER SHEET AND OPTICAL FIBER SHEET PRODUCTION METHOD

(75) Inventors: Daigo Saito, Sakura (JP); Kazuhiro Takizawa, Sakura (JP); Tsuyoshi Shimomichi, Sakura (JP); Yasuhiro Tamaki, Sakura (JP); Yukio Hayashi, Sakura (JP); Kunihiko Fujiwara, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/489,451

(22) PCT Filed: May 29, 2002

(86) PCT No.: PCT/JP02/05191

§ 371 (c)(1),
(2), (4) Date: Feb. 14, 2005

(87) PCT Pub. No.: WO03/025640

PCT Pub. Date: Mar. 27, 2003

(65) Prior Publication Data

US 2005/0129347 A1 Jun. 16, 2005

(30) Foreign Application Priority Data

| | | |
|---|---|---|
| Sep. 13, 2001 | (JP) | 2001-278109 |
| Nov. 16, 2001 | (JP) | 2001-351531 |
| Nov. 20, 2001 | (JP) | 2001-354973 |
| Jan. 30, 2002 | (JP) | 2002-021582 |
| Feb. 15, 2002 | (JP) | 2002-038733 |
| May 24, 2002 | (JP) | 2002-150017 |

(51) Int. Cl.
*G02B 6/00* (2006.01)
*G02B 6/04* (2006.01)

(52) U.S. Cl. .......................... 385/115; 385/15; 385/114

(58) Field of Classification Search ................ 385/114, 385/115, 121
See application file for complete search history.

(56) References Cited

U.S. PATENT DOCUMENTS

| | | | | |
|---|---|---|---|---|
| 4,847,596 A * | 7/1989 | Jacobson et al. | 340/550 |
| 5,611,012 A * | 3/1997 | Kuchenbecker | 385/86 |
| 5,611,017 A * | 3/1997 | Lee et al. | 385/114 |
| 5,649,035 A * | 7/1997 | Zimmerman et al. | 385/13 |
| 5,944,416 A * | 8/1999 | Marsh | 362/568 |
| 6,238,104 B1 * | 5/2001 | Yamakawa et al. | 385/87 |
| 6,363,187 B1 * | 3/2002 | Fells et al. | 385/37 |
| 6,485,191 B1 * | 11/2002 | Sato | 385/73 |
| 6,535,684 B1 * | 3/2003 | Kondo et al. | 385/137 |
| 6,647,188 B2 * | 11/2003 | Quiroz | 385/114 |
| 2004/0067028 A1 * | 4/2004 | Mleczko | 385/78 |
| 2004/0175091 A1 * | 9/2004 | Nonomura et al. | 385/137 |

FOREIGN PATENT DOCUMENTS

| | | |
|---|---|---|
| JP | H07-281052 A | 10/1995 |
| JP | H08-194119 A | 7/1996 |
| JP | H08-339818 A | 12/1998 |
| JP | 2888157 B2 | 2/1999 |
| JP | 11-337762 A | 12/1999 |
| JP | 2001-235635 A | 8/2000 |
| JP | 2001-141937 A | 5/2001 |
| JP | 2001-147330 A | 5/2001 |
| WO | WO 99/30996 A1 | 6/1999 |

* cited by examiner

*Primary Examiner*—Michelle R. Connelly-Cushwa
(74) *Attorney, Agent, or Firm*—Sughrue Mion, PLLC

(57) ABSTRACT

The invention is an optical fiber sheet obtained by adhering together at least two sheets with an optical fiber placed therebetween, and placing a reinforcing tube over a portion of the optical fiber extending from an edge of the sheets, wherein the reinforcing tube is fixed to the sheets by bonding, with the reinforcing tube inserted between the sheets located up and below by an appropriate distance from an edge of the sheets.

26 Claims, 28 Drawing Sheets

OPTICAL FIBER SHEET AND OPTICAL FIBER SHEET PRODUCTION METHOD

BACKGROUND OF THE INVENTION

1. Field of the Invention

The present invention relates to an optical fiber sheet obtained by arranging an optical fiber inside a sheet, and a manufacturing method therefor.

2. Description of the Related Art

Optical fiber sheets used for providing optical fibers in an optical device generally have a configuration such that an optical fiber is placed and adhered between upper and lower resin sheets which having flexibility. However, at a portion where the optical fiber extends from the edge of the sheet, that is, at an end of the optical fiber sheet, a bending force acts on the optical fiber, so that there is the likelihood of damage or characteristic deterioration occurring in the optical fiber. Therefore, reinforcement of the optical fiber is attempted by placing a reinforcing tube over the optical fiber.

For the optical fiber reinforcing structure using a reinforcing tube, it can be considered to connect the end of the reinforcing tube placed over the optical fiber and the end of the sheets by bonding. However, since the end of the reinforcing tube and the end of the sheets are simply bonded, the reinforcing tube may be bent at the portion bonded with the end of the sheets due to the weight of the reinforcing tube itself, giving an increase a transmission loss, or the reinforcing tube is likely to come off from the sheets due to adhesive failure at the bonded portion.

Conventionally, therefore, a fiber reinforcing structure, for example as shown in FIG. 44A to FIG. 44C, is provided at the bonded portion of the reinforcing tube and the sheet. In this fiber reinforcing structure, after the end of a reinforcing tube 1 and the ends of sheets 2 of an optical fiber sheet 6 are connected by bonding (the bonded portion is indicated by reference symbol 3), a reinforcing sheet 4 is further secured by bonding so as to cover the vicinity of the bonded portion 3 from one side or both sides (in the figure, from one side), to thereby reinforce an optical fiber 5 (reinforce the portion extending from the edge of the sheet 2). In the figure, only one optical fiber 5 is shown in the optical fiber sheet 6, but normally, there is a plurality of fibers. Moreover, the optical fiber 5 may be arranged in a curvilinear form, rather than in a linear form.

However, when the vicinity of the bonded portion 3 is reinforced by the reinforcing sheet 4, while this prevents the reinforcing tube 1 from being bent or coming off from the sheet 2 at the base thereof, it causes a problem in that other portions are easily bent due to the weight of the reinforcing sheet 4.

SUMMARY OF THE INVENTION

In order to solve the above problems, the present invention is an optical fiber sheet obtained by adhering together at least two sheets with an optical fiber placed therebetween, and placing a reinforcing tube over a portion of the optical fiber extending from an edge of the sheets, wherein the reinforcing tube is fixed to the sheets by bonding, with the reinforcing tube inserted between the sheets located up and below by an appropriate distance from the edge of the sheets.

In this optical fiber sheet, the end of the reinforcing tube inserted between the sheets located up and below may be split into upper and lower two parts and flattened, and then the sheets located up and below may be adhered thereto.

Moreover, the length of the end of the reinforcing tube split into upper and lower two parts and flattened, and inserted between the sheets located up and below may be changed for the upper and lower parts.

Furthermore, the present invention is an optical fiber sheet obtained by adhering together at least two sheets with an optical fiber placed therebetween, and placing a reinforcing tube over a portion of the optical fiber extending from an edge of the sheets, wherein an end of the reinforcing tube is split into upper and lower parts, one part thereof is inserted between the sheets, and the other part is placed between the external surface of the sheet and a reinforcing sheet prepared separately and fixed by bonding.

In this optical fiber sheet, the end of the reinforcing tube inserted between the sheets located up and below may be split into at least three, and flattened, and the sheets located up and below may be adhered thereto.

The present invention is an optical fiber sheet constructed by arranging an optical fiber inside one or a plurality of sheets having flexibility, wherein a projected portion is formed at an extension portion of the optical fiber at a rear end of the sheet, and a reinforcing tube having upper and lower half cut portions formed therein by making a slit at a front end is placed over the optical fiber extending from the projected portion, so that the half cut portions place the sheet therebetween from above and below.

In this case, the configuration may be such that the width of the projected portion is set to be not larger than the inner diameter of the reinforcing tube, and the projected portion is accommodated inside a cylindrical portion of the reinforcing tube.

Moreover, the length of the half cut portion of the reinforcing tube may be different for the upper and lower portions.

The present invention is an optical fiber sheet constructed by place an optical fiber between a plurality of sheets and fixing it by bonding, or embedding the optical fiber in a resin constituting the sheet, wherein a reinforcing tube having upper and lower half cut portions formed therein by making a slit at a front end is placed over the optical fiber from the rear of the sheet, so that the half cut portions place the sheet therebetween from above and below, and at least one upper reinforcing sheet and at least one lower reinforcing sheet are respectively adhered on the upper and lower faces of the sheet, so as to cover the half cut portions.

In this case, preferably the positions of front ends of the upper reinforcing sheet and the lower reinforcing sheet are deviated fore and aft.

The front edges of the upper reinforcing sheet and lower reinforcing sheet may be extended forward from front edges of the half cut portions.

Moreover, rear edges of the upper reinforcing sheet and lower reinforcing sheet may be extended rearward from rear edges of the sheet.

The present invention is an optical fiber sheet in which a front end of an optical fiber cord accommodating an optical fiber in a reinforcing tube together with tensile strength strands, and the optical fiber exposed from a front end of the optical fiber cord are placed between upper and lower sheets and fixed, wherein a supplementary sheet is adhered on the optical fiber arranged on the sheet located below, the tensile strength strands exposed from the reinforcing tube are arranged on this supplementary sheet, and the sheet located above is adhered on the tensile strength strands.

In this case, a front end of the reinforcing tube may also be placed between the upper and lower sheets and fixed.

The configuration may be such that an adhesive layer, in which the tensile strength strands are embedded, is formed between the rear end of the supplementary sheet and the front end of the reinforcing tube which is arranged away from the supplementary sheet, and the optical fiber located between the supplementary sheet and the reinforcing tube is embedded and fixed in this adhesive layer.

The present invention is an optical fiber sheet in which a single core loose tube optical fiber core formed by placing a tube over an optical fiber arranged inside the sheet via a gap is taken out from the inside of an edge portion of the sheet to outside of the sheet, or a plurality of single core loose tube optical fiber cores formed by placing a tube over each optical fiber of a tape-form multicore optical fiber arranged inside the sheet via a gap is taken out from the inside of an edge portion of the sheet to outside of the sheet, wherein an adhesive is filled into an end of the tubes inserted into the sheet.

Particularly, when the tape-form multicore optical fiber is used, the tubes inside the sheet may be bonded by an adhesive, or the loose tube optical fiber core may be branched in a two-dimensional arrangement.

The present invention is an optical fiber sheet in which a single core loose tube optical fiber core formed by placing a tube over an optical fiber arranged inside the sheet via a gap is taken out from the inside of an edge portion of the sheet to outside of the sheet, or a plurality of single core loose tube optical fiber cores formed by placing a tube over each optical fiber of a tape-form multicore optical fiber arranged inside the sheet via a gap is taken out from the inside of an edge portion of the sheet to outside of the sheet, wherein a portion of the tubes located inside the sheet has a lengthwise unrestrained structure, in which movement along the lengthwise direction of the tubes is not restrained by the sheets located above and below.

In this case, the lengthwise unrestrained structure may be constructed by placing a cylindrical member made of resin, having an inner diameter that does not close contact with an outer peripheral face of the tube, over a portion of the tube located at least inside the sheet. Alternatively, the lengthwise unrestrained structure may be constructed by placing a pair of half cut pieces obtained by dividing a cylindrical member made of resin into halves over a portion of the tube located at least inside the sheet, from upper and lower sides thereof.

Particularly, when the tape-form multicore optical fiber is used, a loose tube optical fiber core may be branched in a two-dimensional arrangement.

The present invention is an optical fiber sheet in which a plurality of single core optical fibers is arranged in tape form inside at least two adhered sheets, and the plurality of optical fibers arranged in tape form is taken out from inside of the sheet to outside of the sheet by passing the optical fibers through a reinforcing tube, wherein a front end portion of the reinforcing tube inside the sheets is divided at least into halves, with one of the half cut pieces adhered on the sheet located below, and the arrangement of the optical fibers is converted from tape form to bundle form, on the half cut piece.

A manufacturing method for an optical fiber sheet according to the present invention comprises: a step for arranging a plurality of single core optical fibers in tape form on a lower side sheet; a step for placing a reinforcing tube, with a front end divided into halves, over a plurality of optical fibers arranged in tape form, until the reinforcing tube overlaps on the sheet, and adhering the half cut piece of the reinforcing tube located below to the sheet located below; a step for converting the arrangement of the optical fibers from the tape form to bundle form, on the half cut piece; a step for placing the half cut piece located above over an arrangement state conversion portion of the optical fiber; and a step for adhering the sheet located above thereto.

DESCRIPTION OF THE PREFERRED EMBODIMENTS

Preferred embodiments of the present invention will be described below, with reference to the drawings. In the description below, members having the same designation have basically the same or a similar construction and function, and hence the description thereof is omitted, unless otherwise specified.

Figure 1A:
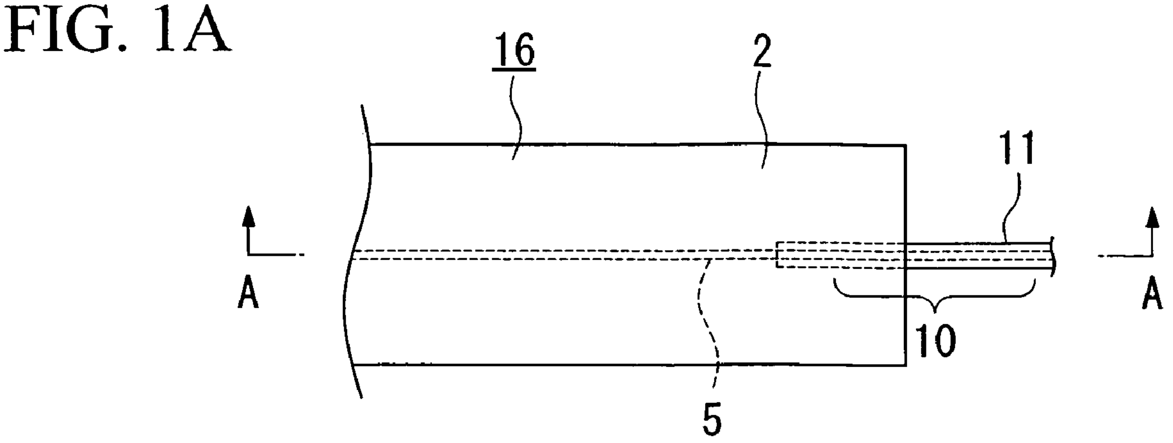
FIG. 1A is a plan view of an end portion of an optical fiber sheet, showing one embodiment of the optical fiber sheet according to the present invention.
Figure 1B:
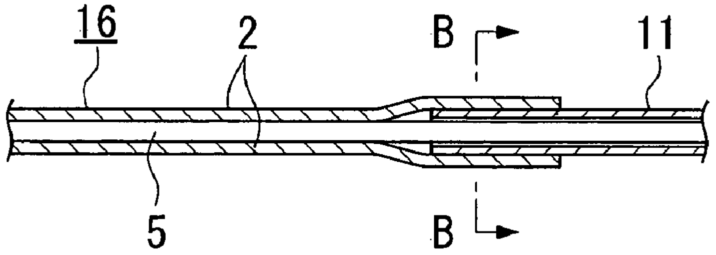
FIG. 1B is a sectional view along the line A-A in FIG. 1A.
Figure 1C:
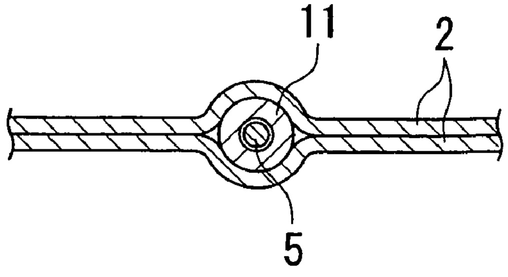
FIG. 1C is a sectional view along the line B-B in FIG. 1B.

One embodiment of the present invention is shown in FIG. 1A to FIG. 1C. In FIG. 1A to FIG. 1C, reference symbol 16 denotes an optical fiber sheet. This optical fiber sheet 16 has a structure such that two sheets 2 are adhered together, with an optical fiber 5 placed therebetween. The portion where the optical fiber 5 is extended from the edge of the sheets 2 in this optical fiber sheet 16, that is, the end

10 of the optical fiber sheet is reinforced as described below. That is, a reinforcing tube 11 is placed over the extension portion of the optical fiber 5 from the sheet edge, and this reinforcing tube 11 is fixed to the sheets 2 by bonding, with the reinforcing tube 11 inserted between the sheets 2 located up and below by an appropriate distance from the edge of the sheets 2. The optical fiber 5 is a UV jacketed fiber (diameter: 250 μm), obtained by applying an ultraviolet hardening-type resin coating on a bare fiber. For the material of the sheets 2, polyimide, polyethylene terephthalate, polyethylene, polypropylene, polyester or the like is used. For the material of the reinforcing tube, nylon, thermoplastic polyester elastomer (trade name Hytrel, manufactured by Du Pont Co.), or the like is used.

In the optical fiber sheet 16, since the end of the reinforcing tube 11 is fixed by bonding, with the end thereof inserted to inside the sheets 2 (inward from the edge of the sheets 2), there is no possibility of the reinforcing tube 11 being bent at the edge of the sheet 2. Therefore, it is possible to prevent the optical fiber 5 being bent together with the reinforcing tube 11, to cause damage of the optical fiber or deterioration in the transmission characteristic.

Since the end of the reinforcing tube 11 is inserted between the sheets 2 and fixed by bonding, the reinforcing tube 11 can be reliably prevented from pulling out from the sheets 2.

Moreover, since a sufficient reinforcing structure can be obtained as described above, a reinforcing member such as a reinforcing sheet is not separately necessary. Therefore, the structure of the optical fiber sheet 16 can be simplified.

Figure 2A:
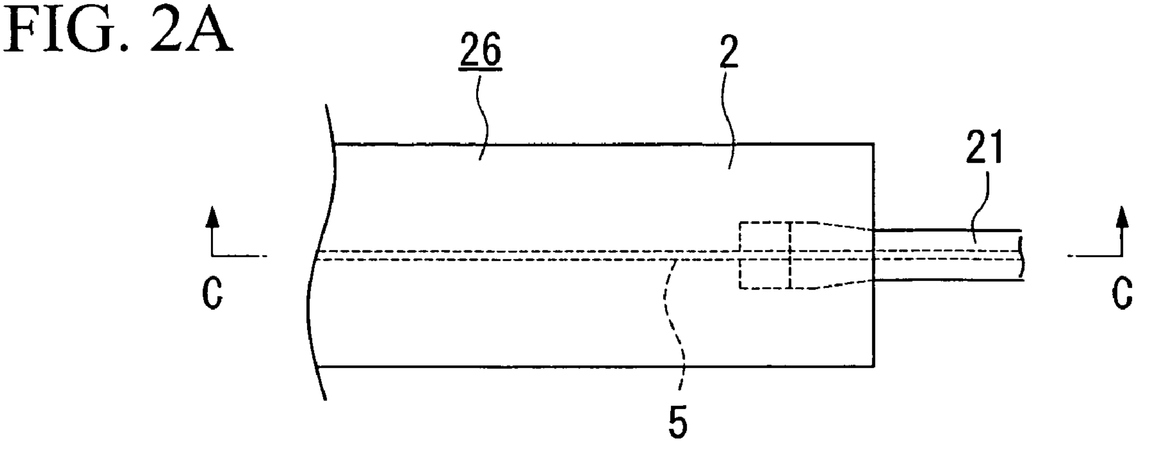
FIG. 2A is a plan view of an end portion of an optical fiber sheet, showing a modified example of the optical fiber sheet according to the present invention.
Figure 2B:
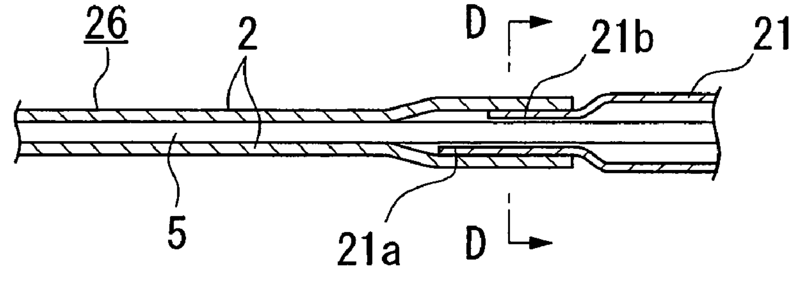
FIG. 2B is a sectional view along the line C-C in FIG. 2A.
Figure 2C:
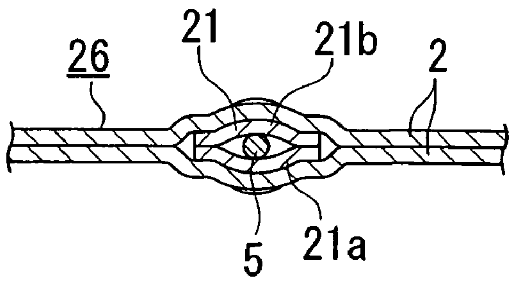
FIG. 2C is a sectional view along the line D-D in FIG. 2B.

A modified example of the present invention is shown in FIG. 2A to FIG. 2C. This example is preferable when a reinforcing tube having a large diameter is used. The end of the reinforcing tube 21 inserted between the sheets 2 located up and below is split into upper and lower two parts and flattened, and then the upper and lower sheets 2 are adhered, to form an optical fiber sheet 26. Moreover, in this example, the length of the upper and lower portions of the split end of the reinforcing tube 21 is changed. In the illustrated example, the lower part 21*a* of the end of the reinforcing tube 21 is longer than the upper part 21*b*.

When the diameter is large, as in the reinforcing tube 21, if it is directly inserted (as the tube) between the sheets, folds are likely occur due to the thickness of the reinforcing tube 21. However, as in the optical fiber reinforcing structure in this example, if the end of the reinforcing tube 21 is split into upper and lower parts and flattened, the thickness of the end of the reinforcing tube 21 is kept from increasing, thereby preventing the formation of folds in the sheets 2.

Moreover, as in this example, if the lengths of the upper and lower parts 21*a* and 21*b* are changed, the sheet thickness increases gradually, and hence buckling does not occur in the sheet at the end of the reinforcing tube 21.

Figure 3A:
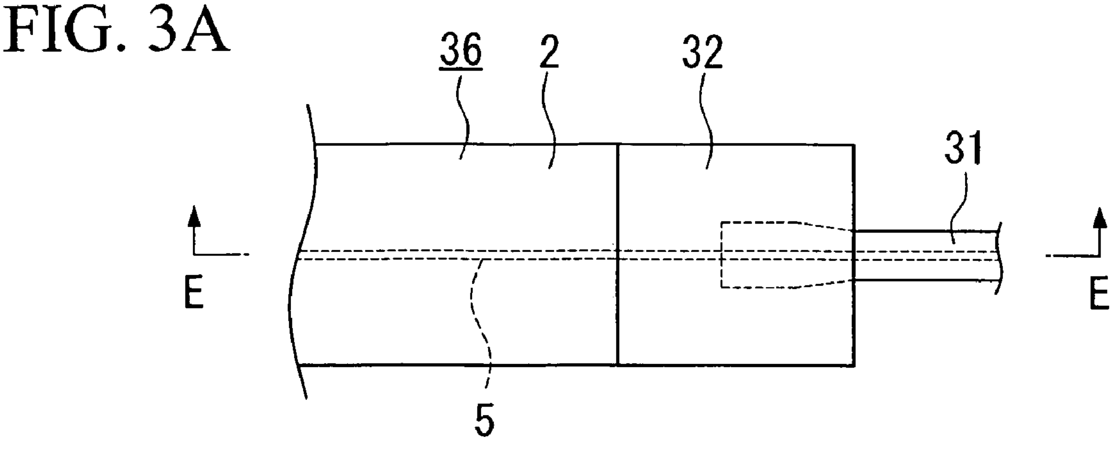
FIG. 3A is a plan view of an end portion of an optical fiber sheet, showing a modified example of the optical fiber sheet according to the present invention.
Figure 3B:
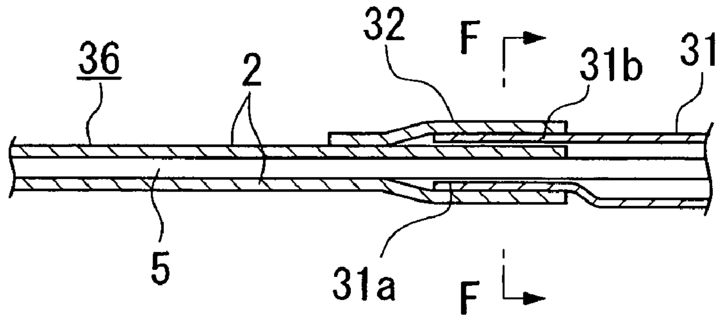
FIG. 3B is a sectional view along the line E-E in FIG. 3A.
Figure 3C:
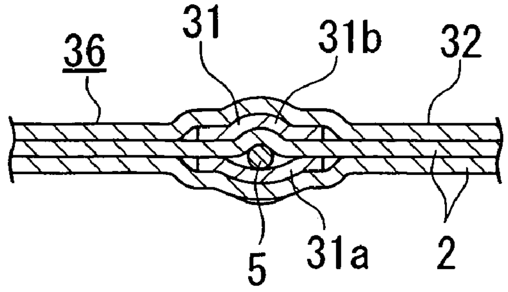
FIG. 3C is a sectional view along the line F-F in FIG. 3B.

Another modified example of the present invention is shown in FIG. 3A to FIG. 3C. The optical fiber reinforcing structure in this example is also suitable when a reinforcing tube having a large diameter is used. The end of the reinforcing tube 31 placed on the optical fiber 5 is split into upper and lower parts, and one part 31*a* of the split parts is inserted between the sheets 2, and the other part 31*b* is placed between the external-surface of the sheet 2 and a reinforcing sheet 32 separately prepared, and both are fixed by bonding, to form an optical fiber sheet 36.

In this example, the split one part 31*a* of the end of the reinforcing tube 31 is inserted to inside the sheets 2 and fixed by bonding, and the other part 31*b* is fixed by bonding between the reinforcing sheet 32 and the external surface of the sheet 2. As a result, the reinforcing tube 31 can be reliably prevented from coming off.

The reinforcing tube 31 becomes flat between the sheets, and since only the one part 31*a* of the reinforcing tube 31 is inserted between the sheets, the reinforcing tube 31 placed between the sheets 2 does not become thick. Therefore, even with a reinforcing tube 31 having a large diameter, folds are unlikely to form on the sheets.

Moreover, since the end of the reinforcing tube 31 is inserted to inside of the sheets 2, the ends of the sheets are unlikely to buckle.

Even in a case where the end of the reinforcing tube is split into two and flattened, then inserted between the sheets and fixed, if the rigidity of the reinforcing tube is high, the reinforcing tube may not always be flattened sufficiently. In such a case, the end of the reinforcing tube may be split and divided into three or more, then flattened and adhered between the upper and lower sheets 2.

Figure 4A:
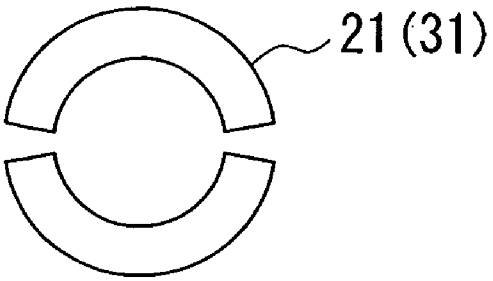
FIG. 4A is a sectional view of a reinforcing tube, showing an example in which the reinforcing tube is divided into two.
Figure 4B:
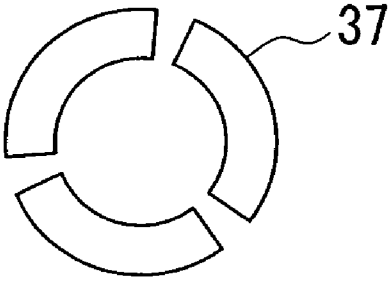
FIG. 4B is a sectional view of the reinforcing tube, showing an example in which the reinforcing tube is uniformly divided into three.
Figure 4C:
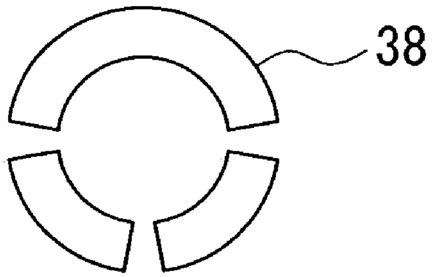
FIG. 4C is a sectional view of the reinforcing tube, showing an example in which the lower side of the reinforcing tube is divided into three.
Figure 4D:
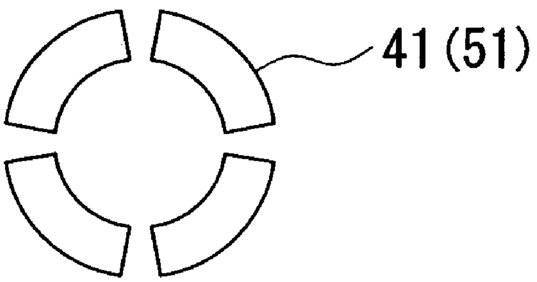
FIG. 4D is a sectional view of the reinforcing tube, showing an example in which the reinforcing tube is divided into four.

Regarding the examples of dividing up the end of the reinforcing tube, FIG. 4A shows the above described case where the reinforcing tube is split into two, but the reinforcing tube may be uniformly split into three as shown in FIG. 4B, or into three in a form divided into upper and lower parts as shown in FIG. 4C, or into four as shown in FIG. 4D. The end of the reinforcing tube can be divided into more parts, but dividing into four is considered to be optimum in view of the work. In FIG. 4A to FIG. 4D, reference symbols 21, 31, 37, 38, 41 and 51 denote a reinforcing tube.

Figure 5A:
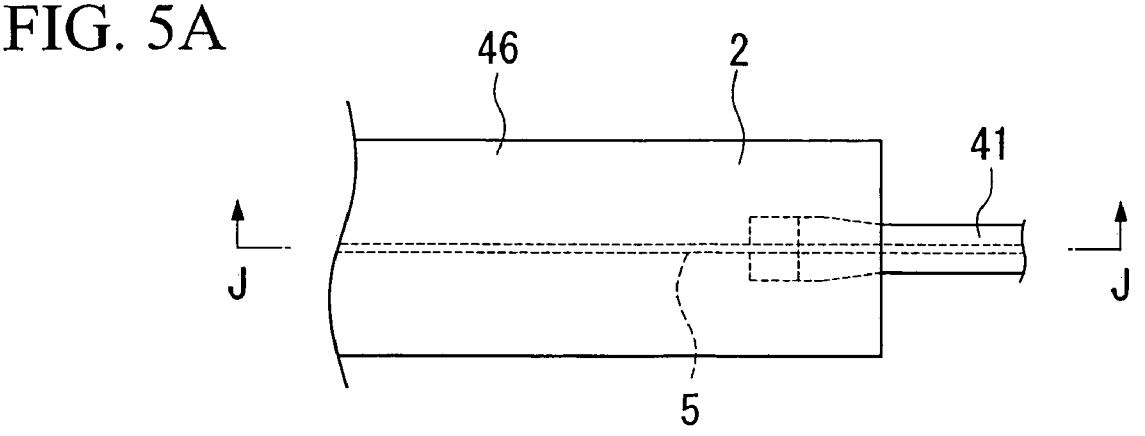
FIG. 5A is a plan view of an end portion of an optical fiber sheet, showing a modified example of the optical fiber sheet according to the present invention.
Figure 5B:
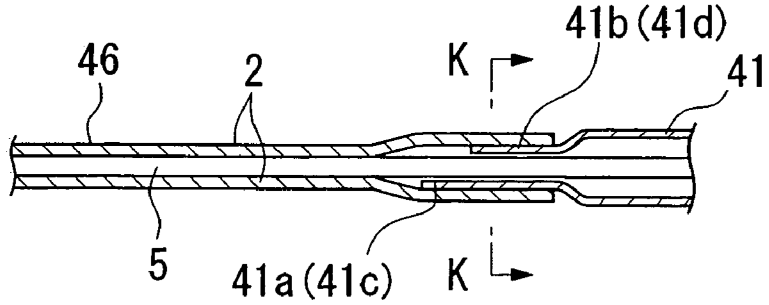
FIG. 5B is a sectional view along the line J-J in FIG. 5A.
Figure 5C:
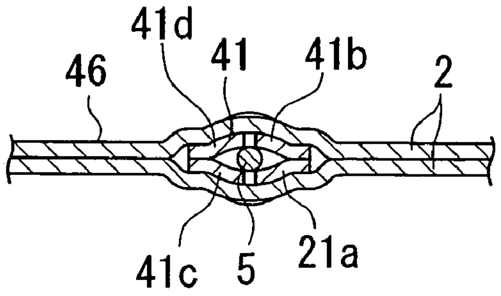
FIG. 5C is a sectional view along the line K-K in FIG. 5B.

FIG. 5A to FIG. 5C show a case in which the reinforcing tube in FIG. 2A to FIG. 2C is split into four, not into two. This optical fiber sheet 46 has a structure such that the end of a reinforcing tube 41 inserted between the upper and lower sheets 2 is split into four and flattened, and adhered between the upper and lower sheets 2. In the illustrated example, the end of the reinforcing tube 41 is made so as to have a different length in the upper part and the lower part. In other words, the two pieces 41*a* and 41*c* on the lower side of the end split into four of the reinforcing tube 41 are made longer than the two pieces 41*b* and 41*d* on the upper side.

Figure 6A:
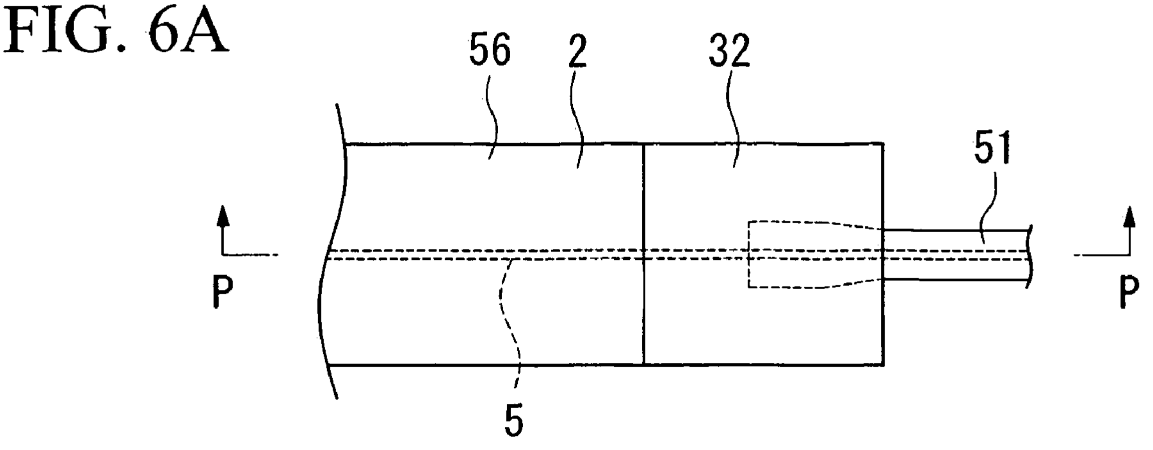
FIG. 6A is a plan view of an end portion of an optical fiber sheet, showing a modified example of the optical fiber sheet according to the present invention.
Figure 6B:
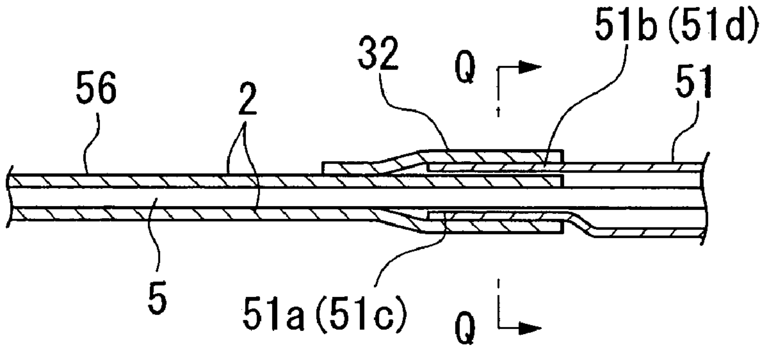
FIG. 6B is a sectional view along the line P-P in FIG. 6A.
Figure 6C:
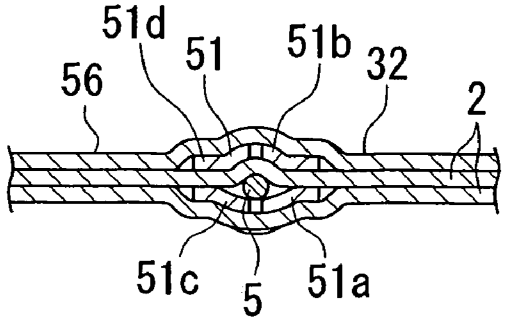
FIG. 6C is a sectional view along the line Q-Q in FIG. 6B.

FIG. 6A to FIG. 6C show a case in which the reinforcing tube in FIG. 3A to FIG. 3C is split into four, not into two. This optical fiber sheet 56 has a structure such that the end of a reinforcing tube 51 placed on the optical fiber 5 is split into four, and two pieces 51*a* and 51*c* on the lower side are inserted between the sheets 2, and the two pieces 51*b* and 51*d* on the upper side are placed between the external surface of the sheet 2 and the reinforcing sheet 32 separately prepared, and fixed by bonding.

As described above, when the end of the reinforcing tube 41, 51 is split into four, then even when the rigidity of the reinforcing tube is high, the reinforcing tube 41, 51 can be further flattened, as compared to the case where the reinforcing tube is split into two. As a result, formation of folds in the sheet 2 can be prevented more reliably. Moreover, splitting the end of the reinforcing tube 41, 51 into four is also effective for preventing the reinforcing tube 41, 51 from coming off.

In the above embodiment, the explanation is given for an optical fiber sheet in which only one optical fiber 11 is provided, but normally a plurality of optical fibers is laid out.

Moreover, in the above embodiment, the explanation is given for an optical fiber sheet having a structure where two sheets are adhered to each other. However, the present invention is also applicable to a multilayered optical fiber sheet having a structure where three or more sheets are adhered to each other.

Another embodiment of the present invention will be described with reference to FIG. 7A to FIG. 11.

Figure 7A:
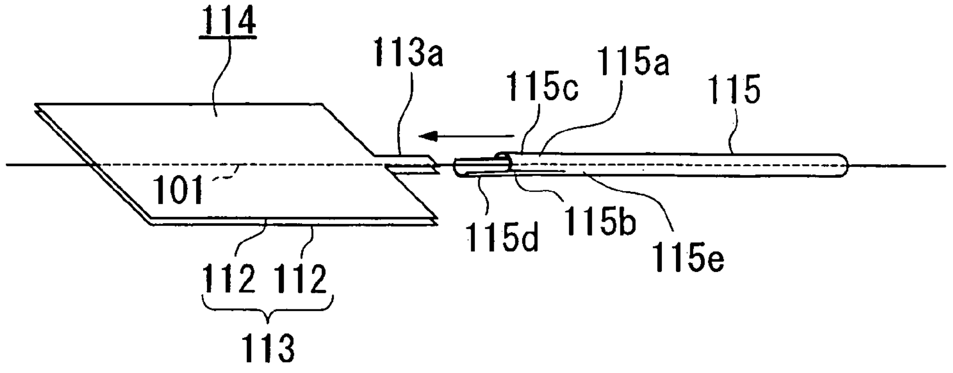
FIG. 7A is a perspective view showing a state before the reinforcing tube is fitted, for explaining another embodiment of the optical fiber sheet according to the present invention.
Figure 7B:
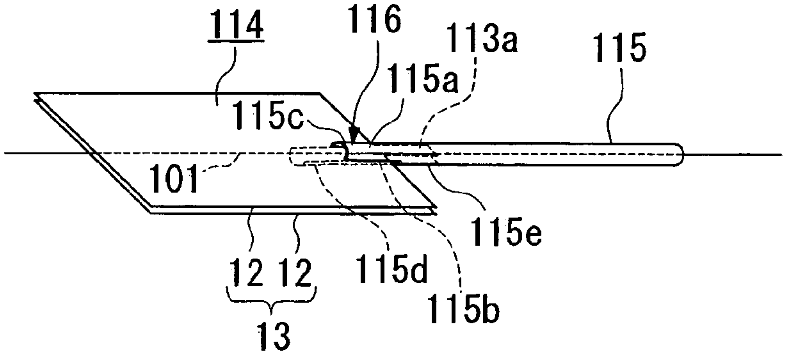
FIG. 7B is a perspective view showing a state where the reinforcing tube is fitted to constitute a fiber reinforcing structure, for explaining the other embodiment of the optical fiber sheet according to the present invention.
Figure 8A:
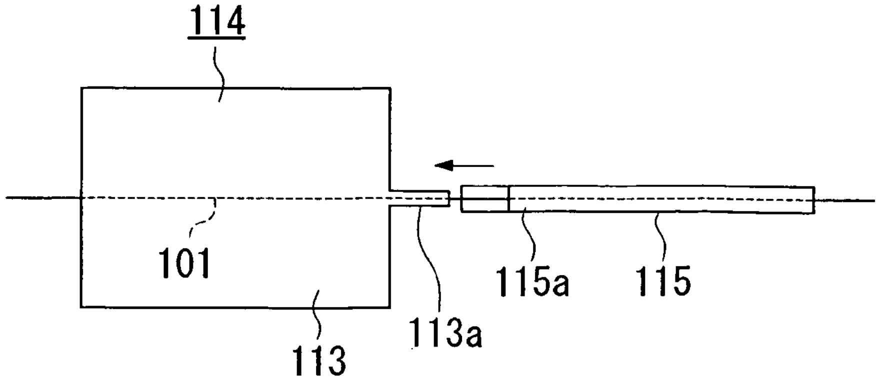
FIG. 8A is a plan view of FIG. 7A.
Figure 8B:
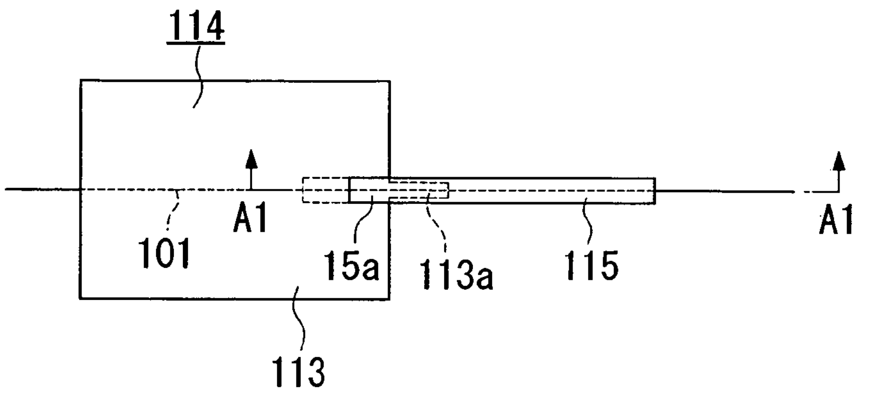
FIG. 8B is a plan view of FIG. 7B.
Figure 9:
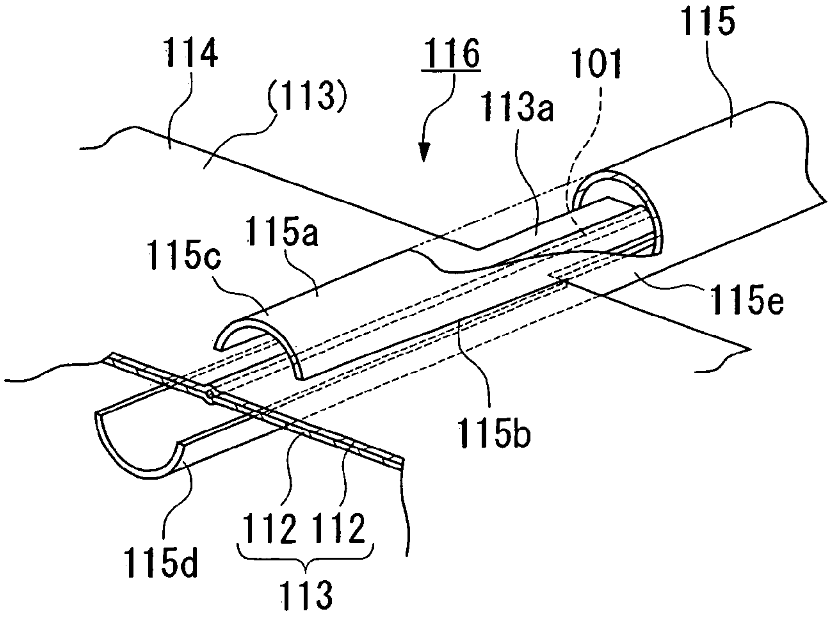
FIG. 9 is a perspective view, with the main part in FIG. 7B partially cut away.
Figure 10:
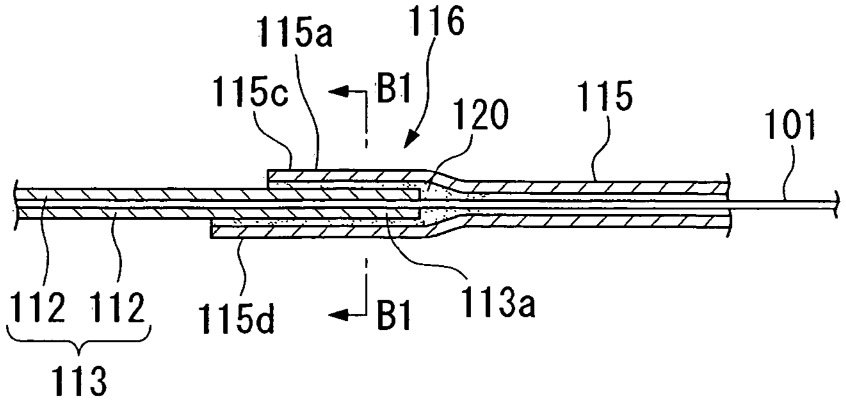
FIG. 10 is an enlarged sectional view along the line A1-A1 in FIG. 8B.
Figure 11:
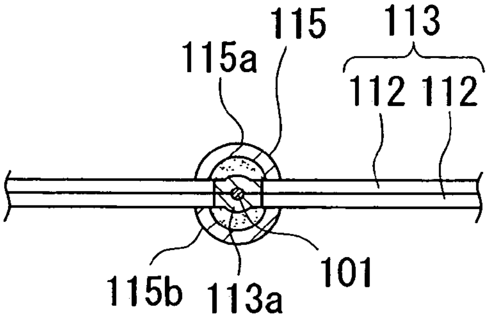
FIG. 11 is an enlarged sectional view along the line B1-B1 in FIG. 10.

FIG. 7A and FIG. 7B are diagrams for explaining an optical fiber sheet 114 in this embodiment. FIG. 7A is a perspective view showing a state before a reinforcing tube 115 is fitted, and FIG. 7B is a perspective view showing a state where the reinforcing tube 115 is fitted to constitute a fiber reinforcing structure 116. FIG. 8A and FIG. 8B are respectively a plan view of FIG. 7A and FIG. 7B. FIG. 9 is a perspective view, with the main part in FIG. 7B partially cut away.

The optical fiber sheet 114 is constituted by bonding upper and lower two resin sheets 112 having flexibility to each other, with an optical fiber 101 placed therebetween, and the optical fiber 101 is arranged on the inner layer of a sheet body 113 comprising the two resin sheets 112 (that is, between the upper and lower two resin sheets 112). The material of the resin sheets 112 is soft resin, and for example, polyimide is preferable, but other than this, polyethylene terephthalate resin, polyethylene resin, polypropylene resin, polyester resin or the like can be used. The optical fiber 101 is, for example, the UV jacketed fiber described above, and the thickness of the sheet body 113 is for example 1 mm or less.

In the optical fiber sheet 114 in this embodiment, a projected portion 113*a* having a narrow width is formed at a portion of the rear edge of the sheet body 113 from which the optical fiber is taken out, and the optical fiber 101 is extended from the front edge of the projected portion 113*a* to the outside of the sheet, as shown in the figure. The optical fiber 101 extending outside of the sheet is passed through the reinforcing tube 115 consisting of nylon or Hytrel (described above). This reinforcing tube 115 has a slit 115*b*, as shown in FIG. 9, over an appropriate length, to form half cut portions 115*c* and 115*d* on the upper and lower parts. In this embodiment, the lower side half cut portion 115*d* is longer than the upper side half cut portion 115*c*.

The reinforcing tube 115 with the optical fiber 101 passed therethrough is pushed into the sheet body 113 from the rear side, so that, as shown in FIG. 7B, FIG. 8B, FIG. 9, FIG. 10 and FIG. 11, a cylindrical portion (a portion having no slit) 115*e* of the reinforcing tube 115 encloses the projected portion 113*a*, and the half cut portions 115*c* and 115*d* sandwich the sheet body 113 therebetween from upper and lower sides. Moreover, the reinforcing tube 115 is pressed and crushed from upper and lower sides, and the inner face thereof is bonded to the sheet body 113 by an adhesive 120.

While not shown in the figure, the optical fiber 101 is fitted with an optical connector at the right end in the figure.

In the optical fiber sheet 114, the reinforcing tube 115 is fixed to the sheet body 113 by bonding, with the front end thereof (the half cut portions 115*c*, 115*d*) inserted to inside of the sheet body 113. Therefore, the reinforcing tube 115 is reinforced by the sheet body 113, so there is no possibility of bending at the edge of the sheet body 113.

Since the reinforcing tube 115 is fixed to the sheet body 113 by bonding, with the projected portion 113*a* projecting from the sheet body 113 contained therein, the reinforcing tube 115 can be bonded firmly to the sheet body 113. Therefore, the reinforcing tube 115 does not easily come off from the sheet body 113.

Moreover, since the projected portion 113*a* extends into of the reinforcing tube 115, the portion where the optical fiber is taken out is also reinforced.

In this embodiment, since the lengths of the half cut portions 115*c*, 115*d* are different, the bending force is not concentrated, thereby making the reinforcing tube 115 less likely to bent at the front end. However, the lengths of the half cut portions 115*c*, 115*d* need not always be different.

Figure 12A:
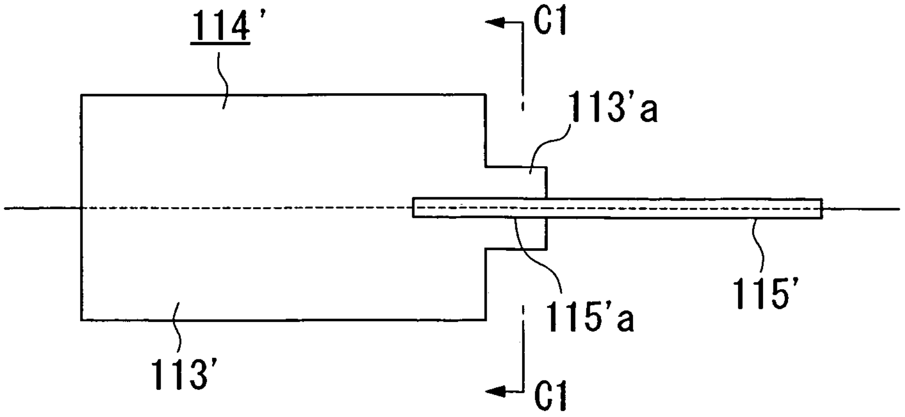
FIG. 12A is a plan view showing a modified example of the optical fiber sheet according to the present invention.
Figure 12B:
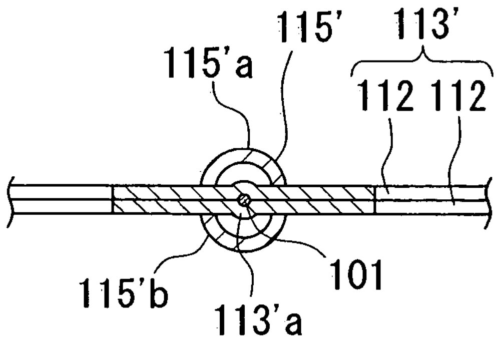
FIG. 12B is an enlarged sectional view along the line C1-C1 in FIG. 12A.

A modified example of the present invention is shown in FIG. 12A and FIG. 12B. In this optical fiber sheet 114', the width of the projected portion 113'*a* formed at the edge of the sheet body 113' is made sufficiently larger than the diameter of the reinforcing tube 115. Therefore, at the front end 115'*a* of the reinforcing tube 115', as shown in FIG. 12B, the projected portion 113'*a* is placed between the upper and lower half cut portions 115'*a* and 115'*b*.

The sheet body 113 in the above example is formed by adhering two resin sheets 112, but the sheet body 113 may be formed from a plurality of resin sheets 112. Moreover, the optical fiber 101 may be embedded in the inner layer of an integral resin sheet, and the optical fiber 101 and the sheet integrally resin-molded, to form the sheet body 113.

The number of the optical fibers inside the sheet body 113, the profile of the sheet body 113 and so on is optional.

A plurality of optical fibers 101 may be extended from one projected portion 113*a*, and these may be passed through one reinforcing tube 115. Alternatively, each of a plurality of optical fibers 101 extended from one projected portion 113*a* may be passed through a reinforcing tube 115.

In this embodiment, the portion on one edge side of the sheet body 113 where the optical fiber is taken out is reinforced by the reinforcing tube 115, and the portion on the opposite side to where the optical fiber is taken out is not reinforced. That is to say, the portion reinforced by the reinforcing tube 115 need only be the portion requiring reinforcement.

Another embodiment of the present invention will be described, with reference to FIG. 13A to FIG. 14B. In this example, explanation is given of a case where one optical fiber 212 is placed between two sheets 214. In the following explanation, front and rear, and up and down indicate the direction of the arrow 213 shown in FIG. 13A. These directions are set for convenience of explanation, and confer no other special meaning.

Figure 13A:
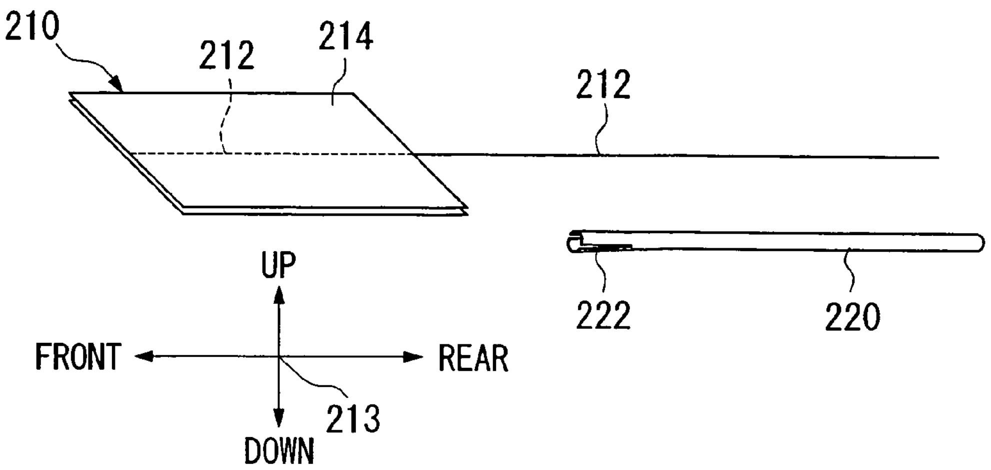
FIG. 13A is a perspective view of an end of the optical fiber sheet, showing an execution procedure in another embodiment of the optical fiber sheet of the present invention.
Figure 13B:
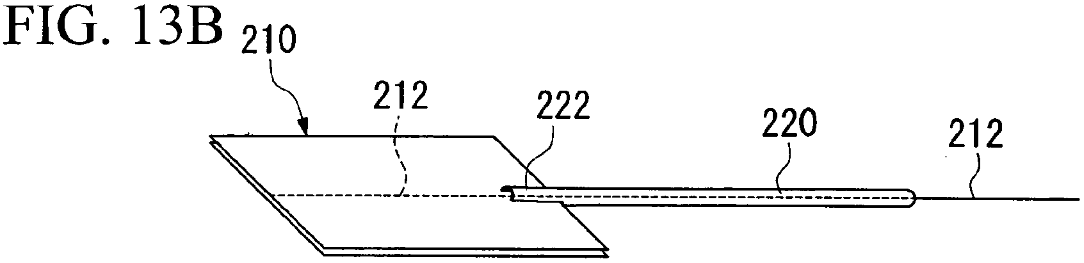
FIG. 13B is a perspective view of the end of the optical fiber sheet, showing the execution procedure in the other embodiment of the optical fiber sheet of the present invention.

A soft resin having an adhesive placed on one side is used for the sheet 214, and for example, polyimide is preferable, but other than this, polyethylene terephthalate resin, polyethylene resin, polypropylene resin, polyester resin or the like can be used. For the reinforcing tube 220, nylon resin, Hytrel (described above), or the like is used, and at the front end thereof, upper and lower half cut portions 222 are formed (see FIG. 13A), by making a slit over an appropriate length. As shown in FIG. 13B, after passing the optical fiber 212 through the reinforcing tube 220, the portion of the sheet 212 from which the optical fiber 212 extends, is placed between the upper and lower half cut portions 222.

Figure 13C:
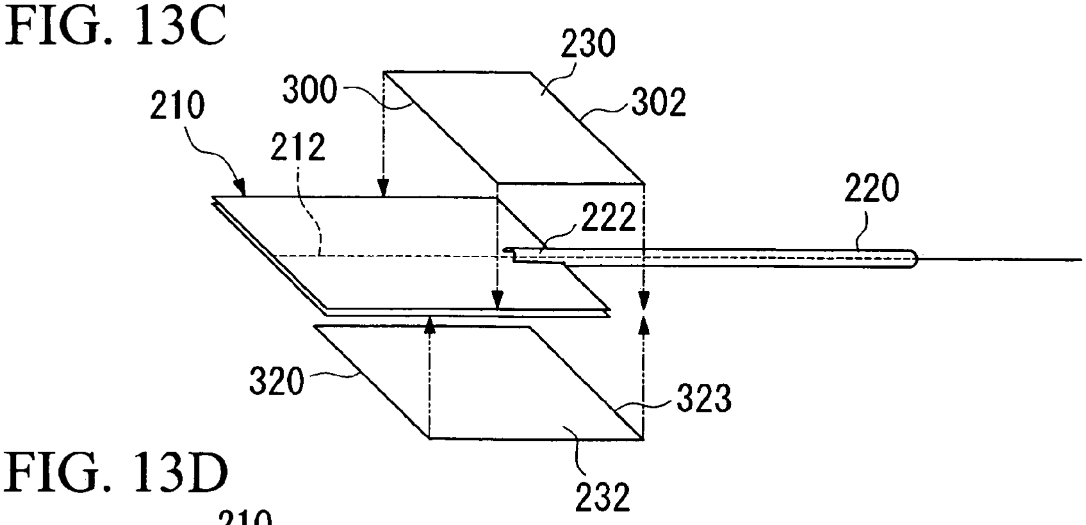
FIG. 13C is a perspective view of the end of the optical fiber sheet, showing the execution procedure in the other embodiment of the optical fiber sheet of the present invention.
Figure 13D:
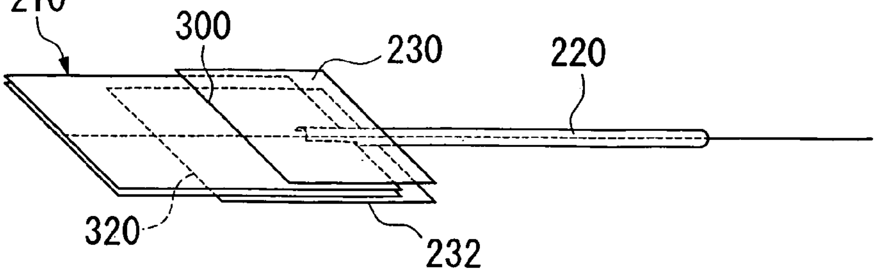
FIG. 13D is a perspective view of the end of the optical fiber sheet, showing the execution procedure in the other embodiment of the optical fiber sheet of the present invention.

As shown in FIG. 13C and FIG. 13D, an upper reinforcing sheet 230 is adhered on the upper surface of the sheet 214, so as to cover the half cut portion 222. The front edge 300 of the upper reinforcing sheet 230 extends forward from the front edge of the half cut portion 222, and the rear edge 302 thereof extends rearward from the rear edge of the sheet 214. Similarly, a lower reinforcing sheet 232 is adhered on the undersurface of the sheet 214, so as to cover the half cut portion 222. The front edge 320 of the lower reinforcing sheet 230 extends forward from the front edge of the half cut portion 222, and the rear edge 322 thereof extends rearward from the rear edge of the sheet 214. In FIG. 13C and FIG. 13D, the upper reinforcing sheet 230 and the lower reinforcing sheet 232 are shown apart from the sheet 214, but actually, the upper reinforcing sheet 230 and the lower reinforcing sheet 232 are pressed respectively to the upper and lower surfaces, and stuck and secured.

Figure 14A:
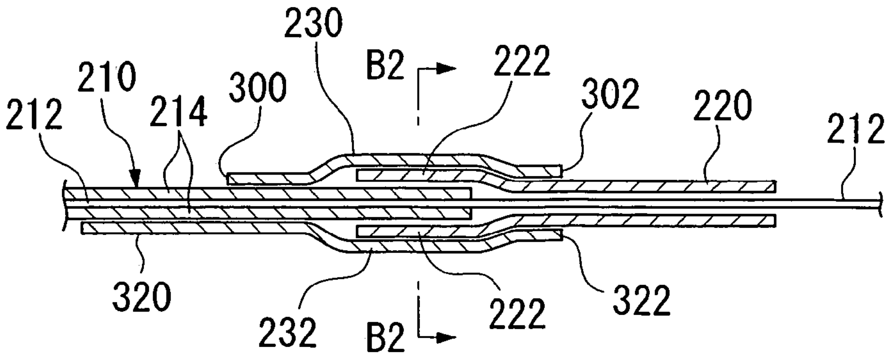
FIG. 14A is a sectional view of an end of the optical fiber sheet, showing a structure in another embodiment of the optical fiber sheet of the present invention.
Figure 14B:
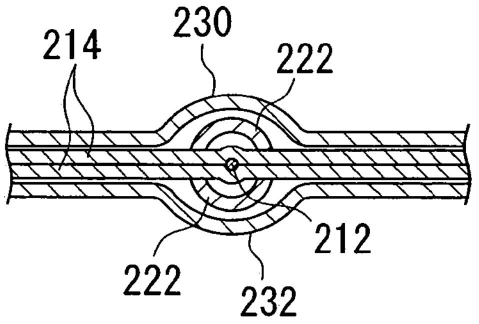
FIG. 14B is a sectional view along the line B2-B2 in FIG. 14A.

As a result, an optical fiber sheet 210 as shown in FIG. 14A and FIG. 14B is formed. In this case, as shown in FIG. 14B, the front edge 320 of the lower reinforcing sheet 232 is located ahead of the front edge 300 of the upper reinforcing sheet 230, and as a result, a fore and aft deviation (discrepancy) is formed between the front edge 320 of the lower reinforcing sheet 232 and the front edge 300 of the upper reinforcing sheet 230. The fore and aft deviation between the front edge 320 of the lower reinforcing sheet 232 and the front edge 300 of the upper reinforcing sheet 230 is not limited to a case where the front edge 320 of the lower reinforcing sheet 232 and the front edge 300 of the upper reinforcing sheet 230 are parallel with each other, as shown in FIG. 13D. In other words, the term “deviation” means that the positions of the front edges 300 and 320 of the respective reinforcing sheets 230 and 232 are made to not coincide with each other vertically. Moreover, needless to say, various variations are possible in the shape and area of the respective reinforcing sheets 230 and 232.

In the optical fiber sheet 210, the reinforcing tube 220 is fitted to the sheet 214, with the front end (half cut portions 222) entering to inside of the sheet 214, and the reinforcing sheets 230 and 232 adhered on the upper and lower surfaces of the sheet 214 so as to cover the half cut portions 222. As a result, since the reinforcing tube 220 is reinforced by the sheet 214 and the reinforcing sheets 230 and 232, the reinforcing tube 220 is unlikely to be bent at the edge of the sheet 214, and the reinforcing tube 220 is unlikely to come off from the sheet 214.

Since the front edges 300 and 320 of the respective reinforcing sheets 230 and 232 extend forward from the front edges of the half cut portions 222, the above described effect is further improved. Moreover, since the rear edges 302 and 322 of the respective reinforcing sheets 230 and 232 extend rearward from the rear edge of the sheet 214, an abrupt decrease in a mechanical stress at the boundary between the reinforcing tube 220 and the sheet 214 is alleviated, and bending at this portion can be prevented.

Furthermore, since the front edges 300 and 320 of the respective reinforcing sheets 230 and 232 are deviated fore and aft, bending force at the front edge of a portion where the reinforcing sheets 230 and 232 are adhered is not concentrated, thereby preventing bending of the sheet 214 in this portion. Bond separation between the sheet 214 and the reinforcing sheets 230 and 232 in this portion can be also prevented.

As the material for the upper reinforcing sheet 230 and the lower reinforcing sheet 232, it is preferable to use a soft resin such as polyimide, with an adhesive stuck to one side, as with the sheet 214.

The sheet 214 in the above embodiment is obtained by adhering two resin sheets, but the number of the resin sheets may be more. Alternatively, the optical fiber 212 may be embedded in the inner layer of an integral resin sheet, to integrally resin-mold the optical fiber 212 and the sheet 214. The number of sheets for the upper reinforcing sheet 230 and the lower reinforcing sheet 232 should be at least one, but may be several according to the strength required for the optical fiber sheet 210. The number of the upper reinforcing sheets 230 and the number of the lower reinforcing sheets 232 may be different.

Another embodiment of the present invention will now be described, with reference to FIG. 18 to FIG. 20.

In general, when an optical connector is fitted to the optical fiber, tensile strength may be required for this optical connector, as in the case of an optical connector fitted to an optical fiber cord having tensile strength strands, such as aramid yarn. In such a case, for the optical fiber cord simply provided with a reinforcing tube, the tensile strength thereof is small, and the tensile strength required for the optical connector cannot be obtained.

Figure 15:
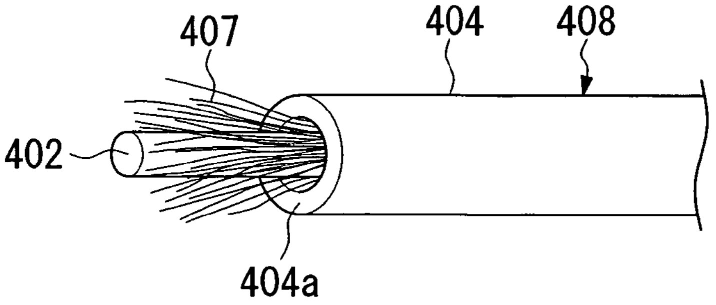
FIG. 15 is a schematic diagram showing the structure of an optical fiber cord, in which tensile strength strands, such as aramid yarn are inserted in a reinforcing tube together with an optical fiber.

Therefore, in order to increase the tensile strength of the optical fiber cord, as shown in FIG. 15, an optical fiber cord 408 is used, in which an optical fiber 402 is accommodated in a reinforcing tube 404 together with tensile strength strands 407, such as aramid yarn.

Figure 16:
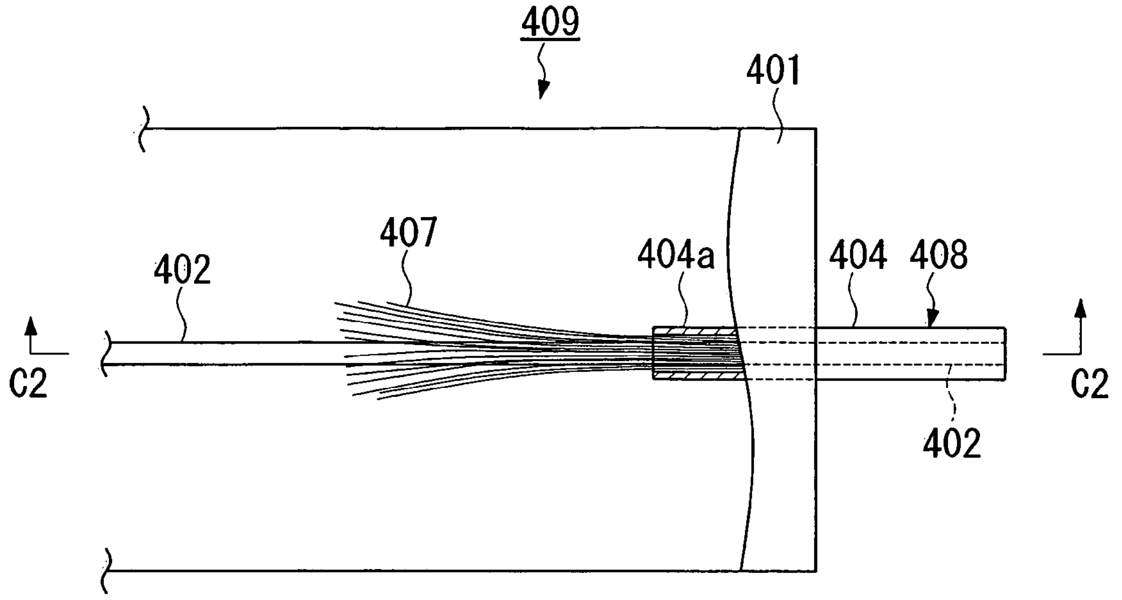
FIG. 16 is a plan view showing an optical fiber sheet, using the optical fiber cord in FIG. 15, with a part thereof cut away.
Figure 17:
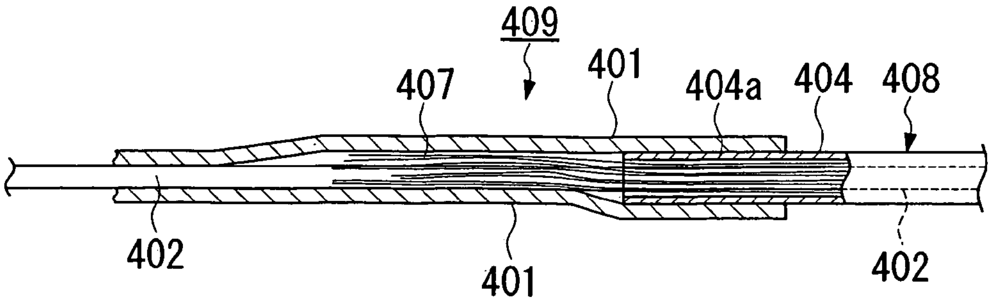
FIG. 17 is a sectional view along the line C2-C2 in FIG. 16.

When the optical fiber cord 408 in which the optical fiber 402 is accompanied with tensile strength strands 407 is used, then as a structure for holding the front end 404*a* of the reinforcing tube 404 in the sheets 401, there can be mentioned a structure as shown in FIG. 16 and FIG. 17. In this optical fiber sheet 409, the front end 404*a* of the reinforcing tube 404 is accommodated inside of the sheets 401, and the tensile strength strands 407 exposed from the reinforcing tube 404 are arranged on the lower side sheet 401, together with the optical fiber 402, and the upper side sheet 401 is adhered thereon.

In the optical fiber sheet 409, the tensile strength of the optical fiber cord 408 itself can be ensured, but even if the tensile strength strands 407 comprising a multiplicity of fine strands and the optical fiber 402 thicker than the tensile strength strands 407 are placed together and the upper and lower sheets 401 are adhered thereto, a sufficiently strong adhesive strength may not be obtained between the upper and lower sheets 401. When the tensile strength strands 407 exist together with the optical fiber 402, the tensile strength strands 407 may directly touch the optical fiber 402, or the tensile strength strands 407 may not be stuck and fixed sufficiently firmly between the upper and lower sheets 401, due to a slight gap being formed between the optical fiber 402 and the sheets 401, resulting from the existence of the optical fiber 402. Therefore, there is the possibility that the tensile strength strands 407 and the optical fiber cord 408 are not held in the sheets 401 sufficiently firmly.

Moreover, at the time of laying out the optical fiber 402, if the tensile strength strands 407 enter below the optical fiber 402 in a bundle, the optical fiber 402 may be bent due to the influence thereof, giving an increase in bending loss of the optical fiber 402.

In other words, this embodiment is for providing an optical fiber sheet, where in the case where an optical fiber is laid out between the two sheets and the portion which is taken out from the sheets is formed into an optical fiber cord in which the optical fiber is inserted into a reinforcing tube together with tensile strength strands, there is little likelihood of insufficient adhesive strength for the two sheets, the tensile strength strands and the optical fiber cord can be firmly held in the sheets, and problems such as the optical fiber laid out inside the sheets being bent due to the influence of the tensile strength strands do not arise.

Figure 18:
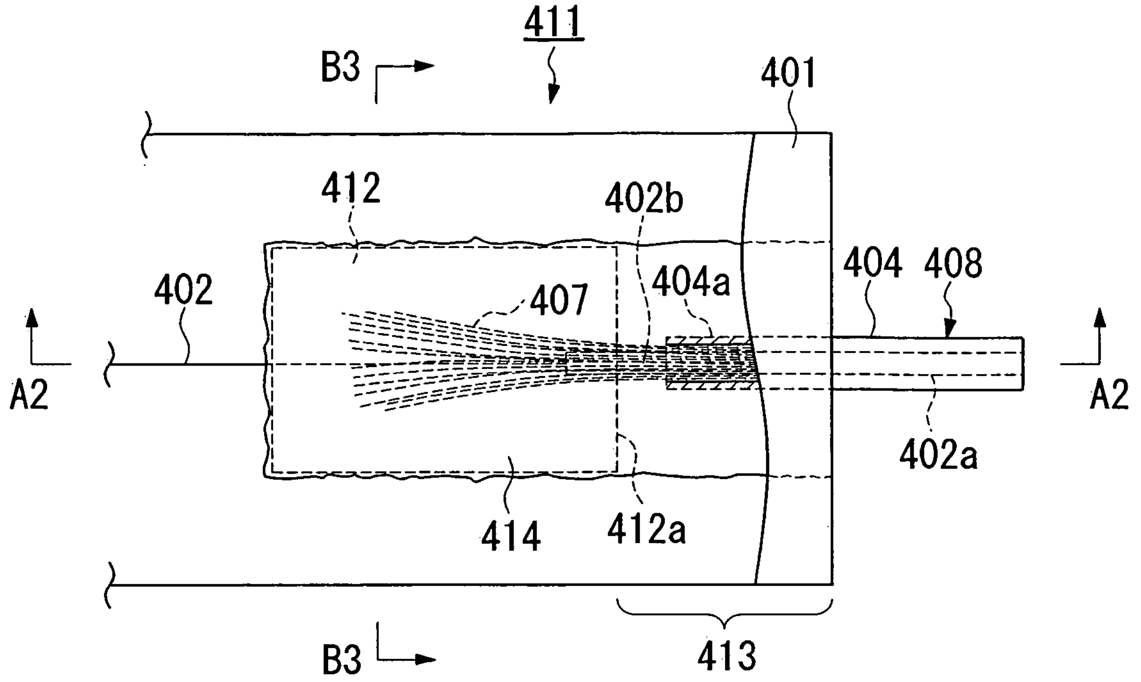
FIG. 18 is a plan view showing another embodiment of the optical fiber sheet of the present invention, with a part thereof cut away.
Figure 19:
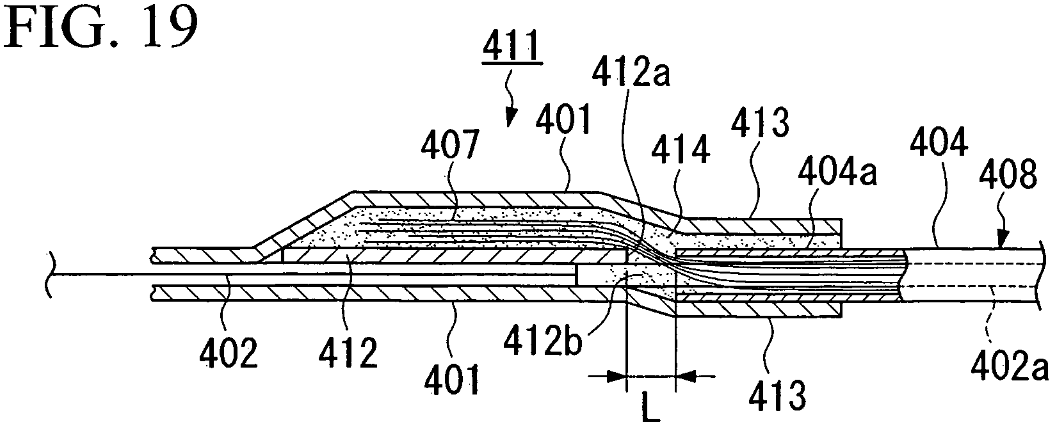
FIG. 19 is a sectional view along the line A2-A2 in FIG. 18.
Figure 20:
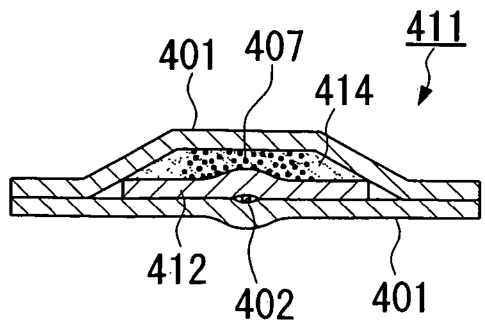
FIG. 20 is a sectional view along the line B3-B3 in FIG. 18.

FIG. 18 is a plan view showing one embodiment of such an optical fiber sheet, with a part thereof cut away, FIG. 19 is a sectional view along the line A2-A2 in FIG. 18, and FIG. 20 is a sectional view along the line B3-B3 in FIG. 18.

In the figure, reference symbol 411 denotes an optical fiber sheet. The optical fiber sheet 411 has a schematic structure such that the front end of an optical fiber cord 408 (more precisely, a front end 404*a* of a reinforcing tube 404 of the optical fiber cord 408) is arranged between two sheets 401, and an optical fiber 402 and tensile strength strands 407 exposed from the front edge of the optical fiber cord 408, are placed between the two sheets 401 and a supplementary sheet 412 arranged between the two sheets 401, and thus fixed.

In the optical fiber cord 408, the optical fiber 402 is accommodated inside the reinforcing tube 404, together with the tensile strength strands 407. However, in this embodiment, an optical fiber accommodated in a thin protective tube 402*a* is used as the optical fiber 402 accommodated inside the reinforcing tube 404. As the optical fiber 402 accommodated in the optical fiber cord 408, for example, a so-called UV jacketed fiber having an external diameter of 250 μm, obtained by coating a bare fiber with an ultraviolet hardening-type resin, or a silicon strand coated with a silicon resin is used, though there is no particular limitation to this. Moreover, according to need, an optical fiber core, an optical fiber cord obtained by further reinforcing this protective coating, an optical fiber tape core, or a carbon coated fiber obtained by further reinforcing this protective coating can be used. Furthermore, as the material for the reinforcing tube 404, nylon, Hytrel (described above), or the like can be used.

The two sheets 401 form the outermost upper and lower layers of the optical fiber sheet 411, and are each a soft resin sheet having flexibility, with one side thereof coated with an adhesive. The material and the thickness of the sheet 401 are appropriately selected, taking Young's modulus into consideration, corresponding to the workability, abrasion resistance, flexural rigidity, and tensile strength required. As a specific material for the sheet 401, for example, there can be mentioned polyimide, polyethylene terephthalate, low density polyethylene, high density polyethylene, polypropylene, polyester, nylon 6, nylon 66, ethylene-tetrafluoroethylene copolymer, poly 4-methyl terpene, polyvinylidene chloride, plasticized polyvinyl chloride, polyether-ester copolymer, ethylene-vinyl acetate copolymer, soft polyurethane and the like. The combination of materials for the sheet 401 is optional, and for example, the upper and lower sheets 401 may be formed from the same material, or formed from a combination of different materials. At the time of manufacturing the optical fiber sheet 411, a cold pressure sensitive adhesive (glue) of a rubber type or acrylic type is applied on one side of the sheet 401, to adhere the upper sheet and the lower sheet.

For the supplementary sheet 412, one in which a pressure sensitive adhesive is formed in sheet form is used here. Moreover, it is also possible to use a soft resin sheet having flexibility, with a pressure sensitive adhesive applied on both sides of a base material formed from the same material as that of the sheet 401. However, it is preferred to use a supplementary sheet 412 thinner than the upper and lower sheets 401.

The front end 404*a* of the reinforcing tube 404 is inserted into the sheets 401, and the tensile strength strands 407 are exposed from the reinforcing tube 404 by an appropriate length. In the portion where the tensile strength strands 407 are exposed, the supplementary sheet 412 having an appropriate width is adhered on the lower side sheet 401 from above the optical fiber 402 arranged on the lower side sheet 401, and the tensile strength strands 407 are expanded so as not to bunch on the supplementary sheet 412, and the upper side sheet 401 is adhered on the supplementary sheet 412 and the lower side sheet 401 from above these.

The front end 404*a* of the reinforcing tube 404 is fixed so as to be placed between extension portions 413, being portions of the upper and lower sheets 401 that extend outward from the rear end 412*a* of the reinforcing sheet 412 (denoting the end on the side facing the front end 404*a* of the reinforcing tube 404). However, the front end 404*a* and the rear end 412*a* of the supplementary sheet 412 are separated by a predetermined distance L, so that the front end 404*a* and the supplementary sheet 412 do not overlap on each other.

The distance L is appropriately set according to the number of cores, the size (outer diameter) and the like of the optical fiber cord 408. For example, when the optical fiber cord 408 is a normal cord having a single core, the distance L can be set as desired, but preferably this is set to be not less than 5 mm. If the distance L is less than 5 mm, it becomes difficult for the adhesive to enter between the front end 404*a* of the reinforcing tube 404 and the rear end 412*b* of the supplementary sheet 412. On the other hand, if the distance L is too long, the length of the tensile strength strands 407 fixed by the adhesive between the upper sheet 401 and the supplementary sheet 412 becomes long, and hence arrangement processing of the tensile strength strands 407 between the upper sheet 401 and the supplementary sheet 412 takes time, which is undesirable. Therefore, the distance L is set to an appropriate length so that such problems do not arise.

After the optical fiber 402 exposed from the front end 404*a* of the reinforcing tube 404 is placed between the lower sheet 401 and the supplementary sheet 412, the protective tube 402*a* is removed, and the optical fiber 402 is further fixed so as to be placed between the upper and lower sheets 401.

The tensile strength strands 407 are fixed, embedded in an adhesive layer 414 provided between the upper sheet 401 and the supplementary sheet 412. In the adhesive layer 414, the front end 404*a* of the reinforcing tube 404 and the optical fiber 402 located between the front end 404*a* and the supplementary sheet 412 (hereinafter also referred to as an embedded portion 402*b*) are also embedded, to integrally secure the tensile strength strands 407, the front end 404*a* of the reinforcing tube 404 and the embedded portion 402*b* of the optical fiber 402 with respect to the sheets 401 and the supplementary sheet 412. As a result, the optical fiber cord 408 is adhered and fixed to the sheets 401 sufficiently firmly. Moreover, a part of the adhesive layer 414 slightly enters between the lower sheet 401 and the supplementary sheet 412. In other words, in this optical fiber sheet 411, the tensile strength strands 407, the optical fiber 402 and the front end 404*a* of the reinforcing tube 404 are integrally fixed by bonding to the upper and lower sheets 401 and the supplementary sheet 412, by the adhesive layer 414 formed from the region between the upper sheet 401 and the supplementary sheet 412, to the region between the supplementary sheet 412 and the lower sheet 401. As a result, a fixing strength (strength against pulling out) of the optical fiber cord 408 with respect to the sheet 401 is improved.

In this embodiment, the portion of the optical fiber 402 embedded and fixed by the adhesive layer 414 is the portion where the protective tube 402*a* exists. Therefore, there is an advantage in that it is possible to prevent the adhesive layer 414 adversely affecting the optical characteristic of the optical fiber 402. Moreover, since the optical fiber 402, in which the reinforcing tube 404 is removed, (embedded portion 402*b*) exists with a length corresponding to the distance L, between the supplementary sheet 412 and the front end 404*a* of the reinforcing tube 404, then when the optical fiber sheet 411 is bent in the vicinity of the supplementary sheet 412, the embedded portion 402*b* is gently curved. Hence there is also the advantage that a local abrupt bend can be avoided between the supplementary sheet 412 and the front end 404*a* of the reinforcing tube 404.

For the adhesive forming the adhesive layer 414, any adhesive which has flexibility even after curing can be used, and for example, an adhesive with a principal ingredient of a special polymer containing a silyl group (trade name: Cemedine Super X manufactured by Cemedine Co., Ltd.) or the like is used.

Since the optical fiber cord 408 has a structure such that the optical fiber 402 accommodated inside the reinforcing tube 404 is accompanied by the tensile strength strands 407, the optical fiber sheet 411 has sufficient tensile strength.

Moreover, since the tensile strength strands 407 and the optical fiber 402 exist in separate layers, problems where the upper and lower sheets 401 are not bonded sufficiently firmly do not arise, due to the co-existence of the multiplicity of relatively thin tensile strength strands 407 (for example, in the case of aramid yarn, the outer diameter is about 12 μm) and the thicker optical fiber 402 (for example, in the case of a nylon core, the outer diameter is 0.9 mm).

Furthermore, since the tensile strength strands 407 are fixed by bonding between the supplementary sheet 412 and the upper sheet 401, separately from the optical fiber 402, problems where the tensile strength strands 407 directly touch the optical fiber 402, or the tensile strength strands 407 are not fixed by bonding sufficiently firmly between the upper and lower sheets 401, due to a gap caused by the existence of the optical fiber 402 do not arise. Therefore, the tensile strength strands 407 are fixed by bonding sufficiently firmly to the supplementary sheet 412 and the upper sheet 401, and as a result, the optical fiber cord 408 can be held in the sheets 401 firmly.

From the above description, in the optical fiber cord 408 in the optical fiber sheet 411 in this embodiment, even when the optical connector is fitted to one end thereof, the tensile strength required for the optical connector fitted to the optical fiber cord 408 can be sufficiently satisfied.

Moreover, since the tensile strength strands 407 are arranged on the supplementary sheet 412 on the optical fiber 402, after the optical fiber 402 is laid out, the problem where the optical fiber 402 is bent at the time of laying out the optical fiber 402, due to the influence of the tensile strength strands 407 does not arise.

Figure 21:
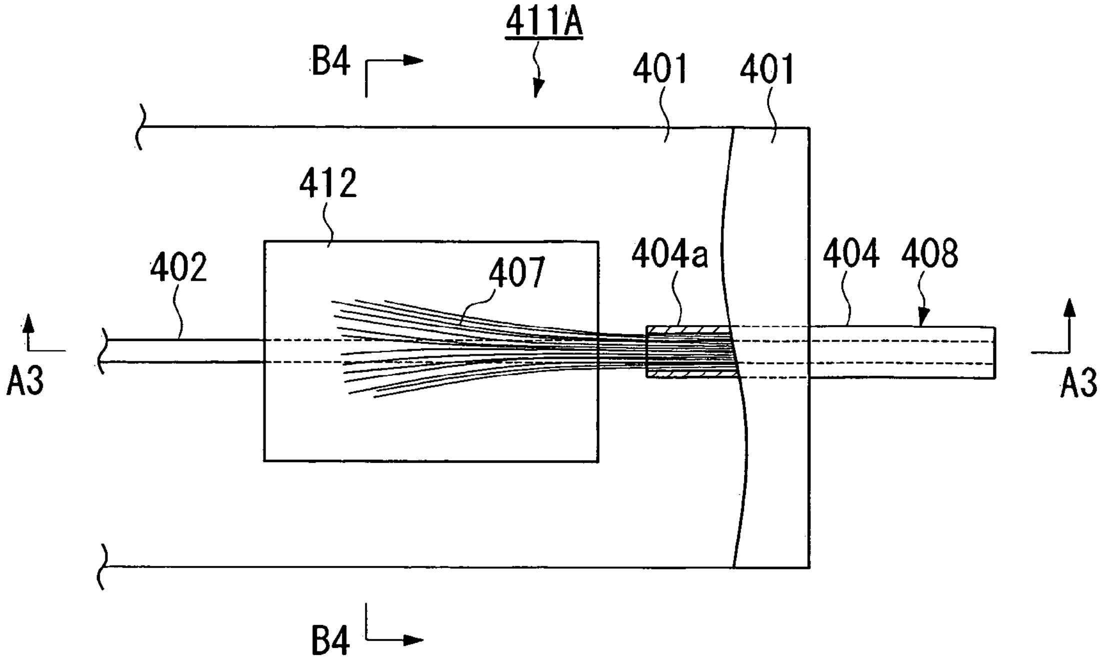
FIG. 21 is a plan view showing a modified example of the optical fiber sheet of the present invention, with a part thereof cut away.
Figure 22:
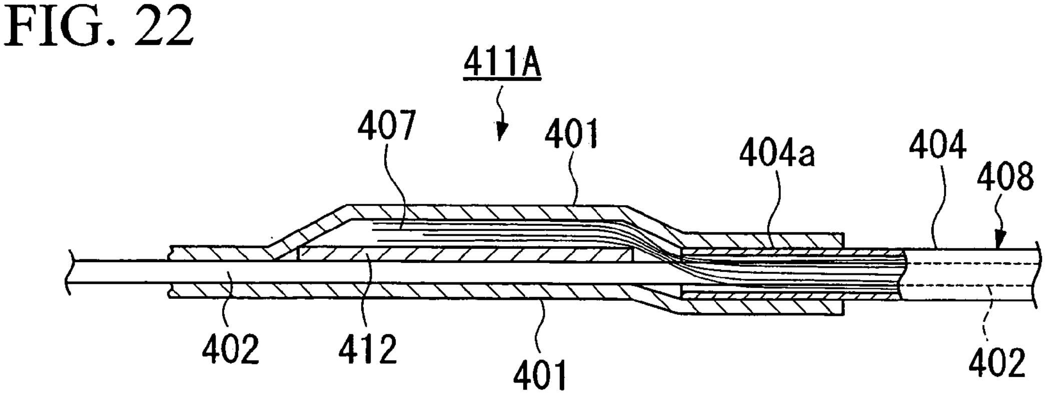
FIG. 22 is a sectional view along the line A3-A3 in FIG. 21.
Figure 23:
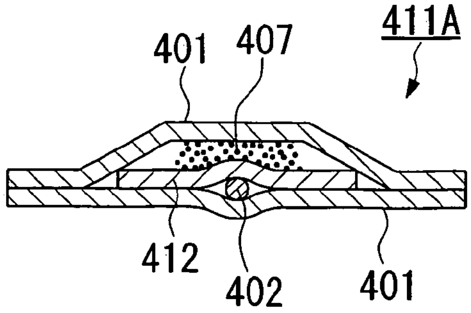
FIG. 23 is a sectional view along the line B4-B4 in FIG. 21.

On the other hand, the configuration may be such that the adhesive layer 414 is not provided, and the front end 404*a* of the reinforcing tube 404 is simply placed between the two sheets 401 and fixed, and the optical fiber 402 and the tensile strength strands 407 exposed from the front end of the optical fiber cord 408 are placed between the two sheets 401 and the supplementary sheet 412 arranged between the two sheets 401, and fixed. FIG. 21 is a plan view of such an optical fiber sheet 411A with a part thereof cut away, FIG. 22 is a sectional view along the line A3-A3 in FIG. 21, and FIG. 23 is a sectional view along the line B4-B4 in FIG. 21. Moreover, the optical fiber sheet 411A has the same configuration as that of the optical fiber sheet 411, except that the there is a space between the adhered two sheets 401 with no adhesive layer 414, and the front end 404*a* of the reinforcing tube 404 is placed between the two sheets 401 and fixed.

Since this optical fiber sheet 411A has a structure such that the optical fiber cord 408 is accompanied by the tensile strength strands 407 such as Kevlar inside the reinforcing tube 404, the optical fiber sheet 411A has sufficient tensile strength. Moreover, since the tensile strength strands 407 and the optical fiber 402 exist in separate layers, the problem where the adhesiveness of the upper and lower sheets 401 decreases due to the co-existence of the tensile strength strands and the optical fiber does not arise. Furthermore, since the tensile strength strands 407 are fixed by bonding between the supplementary sheet 412 and the upper sheet 401, separately from the optical fiber 402, the problem where the adhesiveness between the tensile strength strands 407 and the upper and lower sheets 401 decreases due to the contact between the tensile strength strands 407 and the optical fiber 402 does not arise. Therefore, the tensile strength strands 407 are fixed by bonding sufficiently firmly to the supplementary sheet 412 and the upper sheet 401, and as a result, the optical fiber cord 408 can be held in the sheet 401 firmly.

Moreover, also by fixing the end 404*a* of the reinforcing tube 404 inside the sheets 401, by insertion, the reinforcing tube 404 can be prevented from coming off. As a result, the optical fiber cord 408 can be held in the sheets 401 firmly.

From the above description, also in the optical fiber cord 408 in the optical fiber sheet 411A in this embodiment, when the optical connector is fitted to one end thereof, the tensile strength required for the optical connector fitted to the optical fiber cord 408 can be sufficiently satisfied.

Since the tensile strength strands 407 are arranged on the supplementary sheet 412 on the optical fiber 402, after the optical fiber 402 is laid out, the problem where the optical fiber 402 is bent at the time of laying out the optical fiber 402, due to the influence of the tensile strength strands 407 does not arise.

In the above embodiment, the end 404*a* of the reinforcing tube 404 is fixed inside the sheets by insertion, but a structure in which the reinforcing tube 404 is not inserted inside the sheets, for example, a structure in which the end 404*a* of the reinforcing tube 404 is fixed to the end face of the sheets 401 by bonding can be considered. Also in this case, since the tensile strength strands 407 are firmly fixed inside the sheets by bonding, sufficient holding strength with the sheets 401 can be ensured.

In the above embodiment, there is shown an example using a single core optical fiber where there is only one optical fiber 402 inside the reinforcing tube 404, but in the above technique, a multicore optical fiber cord where a plurality of optical fibers are inserted inside the reinforcing tube 404 together with the tensile strength strands 407 can be also applied. Also when a plurality of optical fibers is used, similarly to when a single core optical fiber is used, the plurality of optical fibers are laid out on the lower sheet 401, the supplementary sheet 412 is adhered thereon, the tensile strength strands 407 are arranged on the supplementary sheet 412, and thereafter the upper sheet 401 is adhered.

As described above, as the supplementary sheet 412, one in which the pressure sensitive adhesive is formed in sheet form is used. In this case, for example, one obtained by placing the pressure sensitive adhesive between two peelable sheets, is appropriately cut into a desired shape and used. In other words, at the time of use, the peelable sheet covering the lower side is peeled, to stick the supplementary sheet 412 onto the optical fiber 402, and then the peelable sheet covering the upper side is peeled, to stick the upper sheet 401 onto the supplementary sheet 412. After bonding, since the pressure sensitive adhesive constituting the bonding face between the supplementary sheet 412 and the upper and lower sheets 401 is integrated, delamination does not occur between the supplementary sheet 412 and the upper and lower sheets 401. On the other hand, for a similar reason, the supplementary sheet 412 after bonding does not exist as an independent sheet (layer). However, in the present invention, this is referred to as the supplementary sheet 412, and includes one integrated with the pressure sensitive adhesive applied on one side of the sheet 401 after bonding Other embodiments of the present invention will be described, with reference to FIG. 24 to FIG. 36B.

The optical fiber sheet includes one in which a tape-form multicore optical fiber 503 obtained by forming a plurality of optical fibers 502 in tape form, is arranged between upper and lower sheets 504, the respective optical fibers 502 are loosely covered via a gap with a tube 505 whose front end is inserted to inside the sheets 504, and these optical fibers 502 are branched respectively, as single core loose tube optical fiber cores 506, and taken outside of the sheets 504. Moreover, at the tip of each of the branched loose tube optical fiber cores 506, an optical connector 507 is fitted. In the figure, the taken out length L1 of the optical connector 507 is shown short, but normally the taken out length L1 is, for example, 1 to 2 m.

In the above description, “loose” indicates that the optical fiber 502 is inserted with a gap, without close contact with the inner surface of the tube 505.

Figure 24:
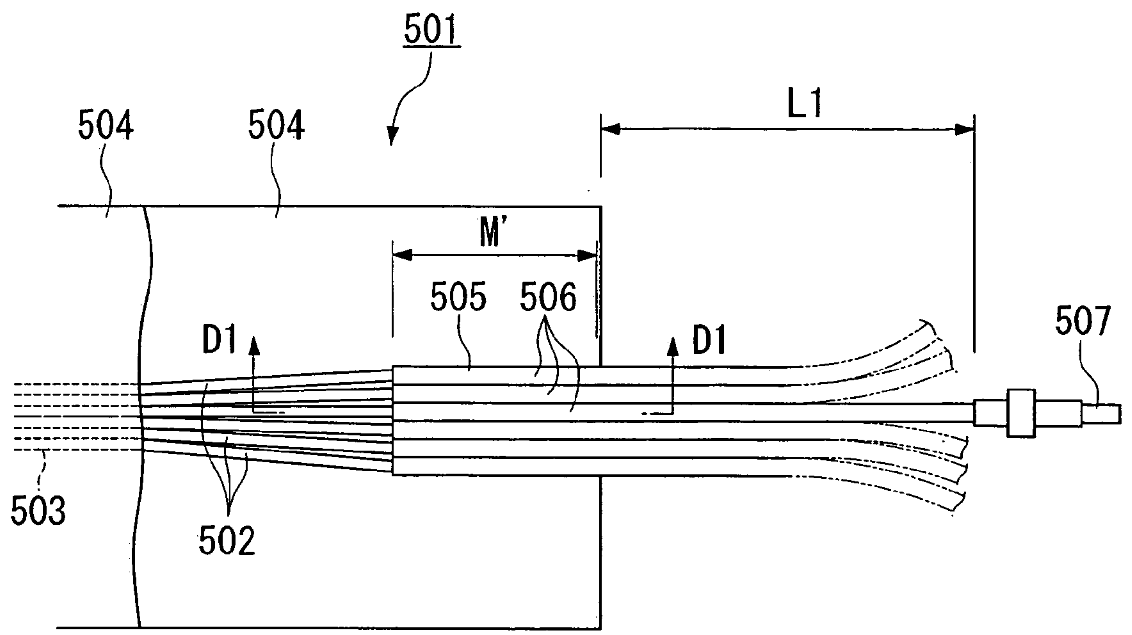
FIG. 24 is a plan view showing an example of the optical fiber sheet, to which the embodiment of the present invention is applied, with a part thereof cut away.
Figure 25:
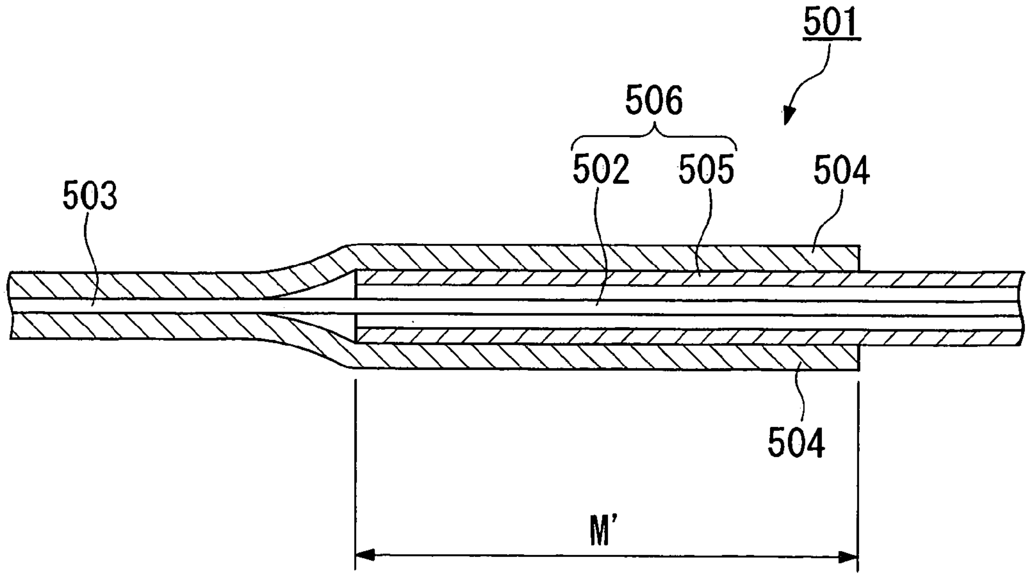
FIG. 25 is a sectional view along the line D1-D1 in FIG. 24.

On the upper and lower sheets 504, a pressure sensitive adhesive (glue) is respectively applied, and when the upper and lower sheets 504 are adhered to each other, the ends of the tubes 505 are directly brought into contact with the sheets 504 and fixed by bonding, together with the respective optical fibers 502, at a portion indicated by a length M' in FIG. 24. Therefore, the ends of the tubes 505 are held in the sheets 504, and as a result, even if a certain degree of tensile force acts from the optical connector 507 side, the tubes 505 do not come off from the sheets 504. Moreover, since the rear ends of the tubes 505 are fitted to the optical connectors 507, and the front ends thereof are held in the sheets 504, the tubes 505 are closed at opposite ends.

In this optical fiber sheet 501, since both ends of the tubes 505 are closed, then when the temperature of the air in the tubes 505 becomes high due to a change in environment and is expanded, the expanded air may enter into the sheets 504, and generates bubbles inside the sheets 504, and these bubbles may apply an unreasonable stress to the optical fiber 502. Moreover, for example, when the optical fiber sheet 501 is installed in an environment where there is a temperature change, such as an engine room or a trunk of a motor vehicle or a room, an extension or compression stress may be applied to the optical fiber 502, with extension and contraction of the tube 505 due to the temperature change. Since the coefficient of linear expansion of the resin of the tube 505 is large, compared with that of the glass of the optical fiber 502, extension and contraction of the tube 505 with respect to the temperature change exerts a large influence on the optical fiber 502.

The rear end of the tube 505 fitted to the optical connector 507 side is connected to the optical fiber 502 in the optical connector 507 and/or a housing, to which the optical connector 507 is connected, for example, by using an adhesive. At this time, since the gap between the inner diameter of the tube 505 and the outer diameter of the optical fiber 502 is small, the adhesive having entered the gap closes the rear end of the tube 505, and as a result, circulation of air on the inside and outside of the tube 505 may become difficult. Such a phenomenon may also occur when the tube 505 and the housing are connected not by bonding but by mechanical fastening or pressing. That is to say, the term “close” referred to herein also includes a state where the rear end of the tube 505 is not completely closed, but becomes an airtight condition to a degree that trouble may occur during use.

In other words, this embodiment is for providing an optical fiber sheet where there is no possibility of the air in the tube of the loose tube optical fiber core entering the sheets, and an optical fiber sheet in which no stress is applied to the optical fiber, even if the tube of the loose tube optical fiber core expands or contracts due to a change in environment, such as a temperature change.

Figure 26:
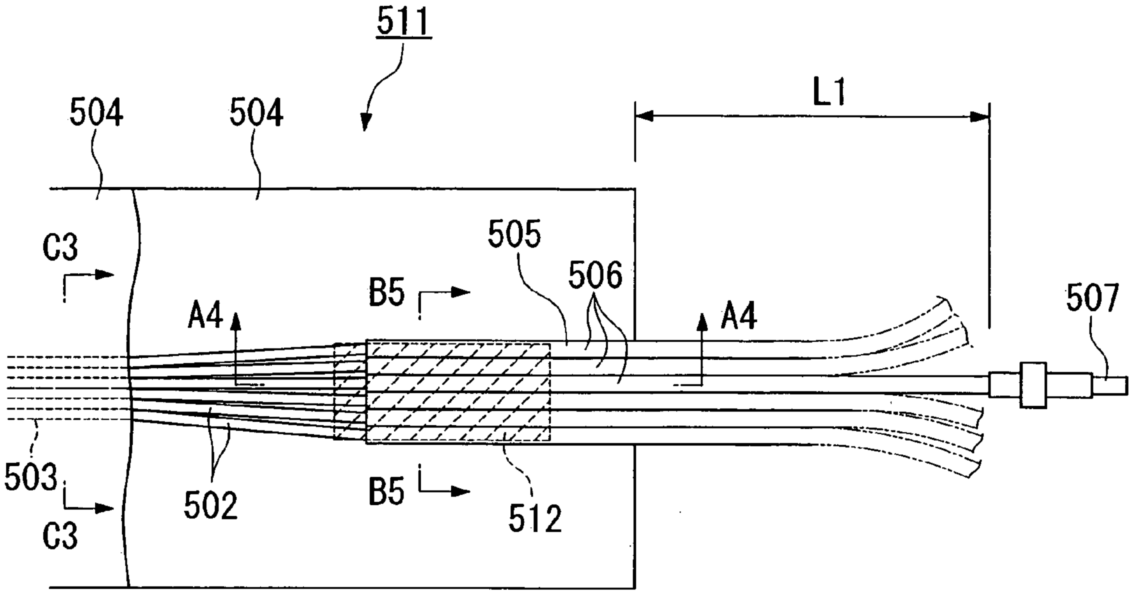
FIG. 26 is a plan view showing another embodiment of the optical fiber sheet, with a part thereof cut away.
Figure 27:
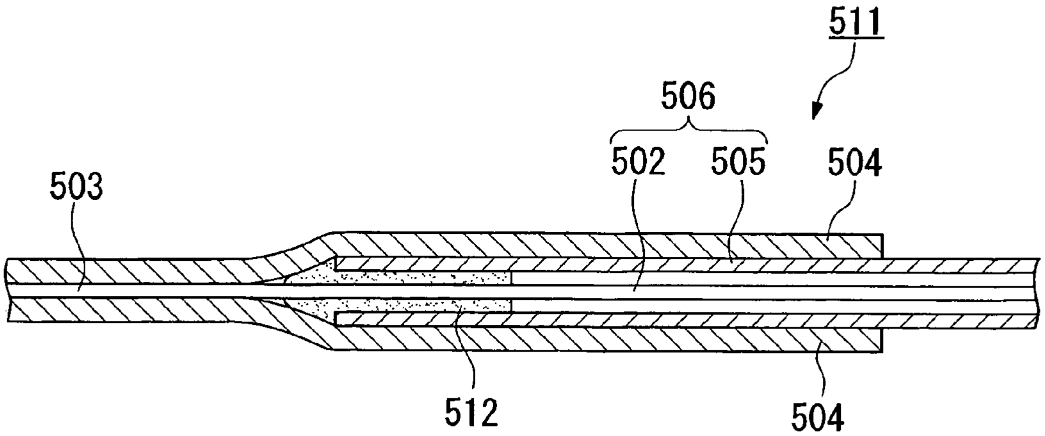
FIG. 27 is an enlarged sectional view along the line A4-A4 in FIG. 26.
Figure 28A:
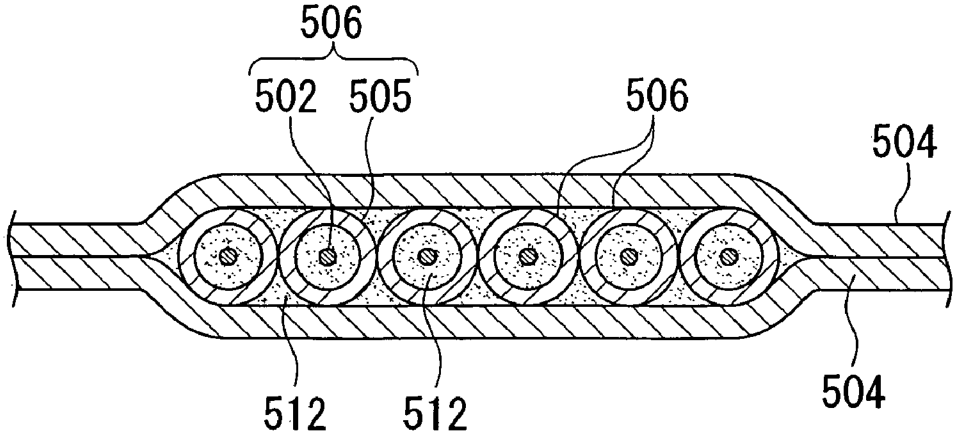
FIG. 28A is a sectional view along the line B5-B5 in FIG. 26.
Figure 28B:
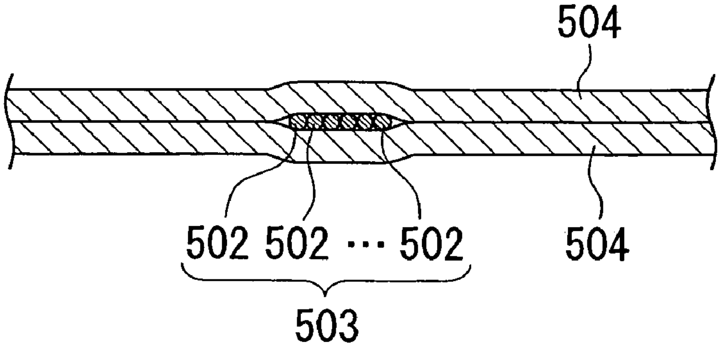
FIG. 28B is a sectional view along the line C3-C3 in FIG. 26.

FIG. 26 is a plan view of an optical fiber sheet 511, with a part thereof cut away, showing one embodiment of such an optical fiber sheet, FIG. 27 is an enlarged sectional view along the line A4-A4 in FIG. 26, FIG. 28A is a sectional view along the line B5-B5 in FIG. 26, and FIG. 28B is a sectional view along the line C3-C3 in FIG. 26. In FIG. 27 and FIG. 28A, the upper sheet is shown not cut away.

In this embodiment, a cold pressure sensitive adhesive (glue) of a rubber type or acrylic type is respectively applied on one side of the upper and lower sheets 504, and when the upper and lower sheets 504 are adhered to each other, the ends of the tubes 505 are inserted into the sheets 504 and fixed, together with the respective optical fibers 502. Since in this manner, the ends of the tubes 505 are held in the sheets 504, then even if a certain degree of tensile force acts from the optical connector 507 side, the tubes 505 do not come off from the sheets 504.

Furthermore, an adhesive 512 is filled into the ends of the tubes 505 inserted into the sheets 504. Additionally, in the illustrated example, the respective tubes 505 are bonded to each other by the same adhesive 512. The area spread with the adhesive is indicated by hatching in FIG. 26. For the adhesive 512 used here, for example, an adhesive with a principal ingredient of a special polymer containing a silyl group (Cemedine Super X described above) can be used. The adhesive may be one that can close the ends of the tubes 5, functionally, and hence one generally referred to as a sealing compound can be also used.

As a procedure for preparing the optical fiber sheet 511, the adhesive 512 is filled into the ends of the tubes 505 of the loose tube optical fiber cores 506 in advance to seal the ends, the tape-form multicore optical fiber 503 is arranged on the lower sheet 504, the sealed portions of the tubes 505 are arranged on the lower sheet 504, the tubes 505 arranged on the lower sheet 504 are bonded to each other by the adhesive 512, and the upper sheet 504 is adhered thereon. At the time of filling the adhesive 512 into the ends of the tubes 505, the tubes 505 may be bonded to each other by the adhesive.

The upper and lower sheets 504 are resin sheets having flexibility, and the material and the thickness thereof are appropriately selected, taking Young’s modulus into consideration, corresponding to the workability, abrasion resistance, firmness (flexural rigidity), and tensile strength which will be required. For example, there can be used films of polyimide, polyethylene terephthalate, low density or high density polyethylene, polypropylene, polyester, nylon 6, nylon 66, ethylene-tetrafluoroethylene copolymer, poly 4-methyl pentene, polyvinylidene chloride, plasticized polyvinyl chloride, polyether-ester copolymer, ethylene-vinyl acetate copolymer, soft polyurethane and the like.

The tube 505 is for example a tube having an outer diameter of about 0.9 mm, and various materials can be used from the standpoint of wear resistance, flame resistance, smoothness and the like. For example, a nylon resin can be used. The illustrated optical fiber 502 is a bare fiber, but it may be an optical fiber applied with a coating (for example, a UV jacketed fiber).

In the optical fiber sheet 511, the opposite ends of the tube 505 are closed, with the rear end side closed by the optical connector 507 and the front end side by the adhesive 512. Therefore, even if the temperature of the air in the tube 505 becomes high due to a change in environment and the air expands, only the tube 505 is expanded, and bubbles are not generated inside the sheets 504 due to the expanded air in the tube 505 entering into the sheets 504. As a result, unreasonable stress is not applied to the optical fiber 502 by the bubbles. Simple expansion of the tube 505 does not adversely affect the optical fiber 502.

Since the plurality of tubes 505 located inside the sheets 504 are bonded to each other by the adhesive 512, the respective tubes 505 uniformly undergo tension, thus preventing a large tension from acting on a specific tube 505. Therefore, the tubes 505 are unlikely to come away from the sheets 504.

Figure 29A:
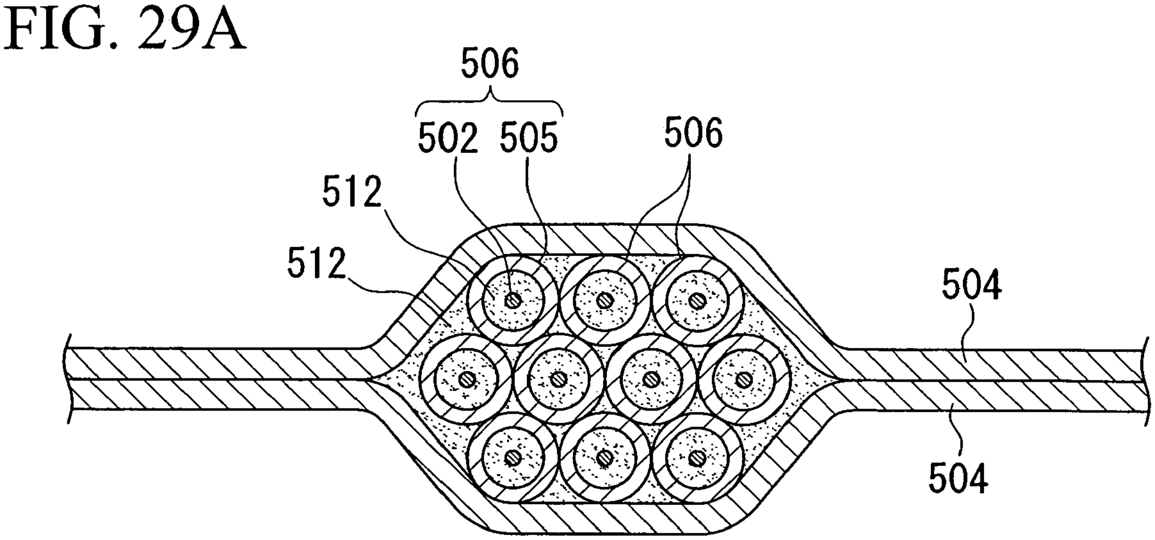
FIG. 29A is a sectional view corresponding to FIG. 28A, showing a modified example of the optical fiber sheet of the present invention.
Figure 29B:
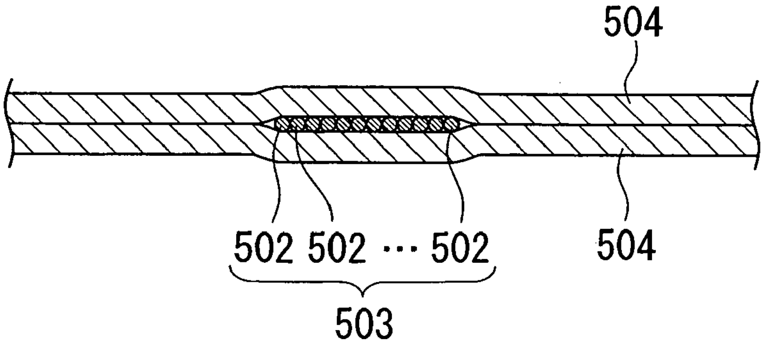
FIG. 29B is a sectional view corresponding to FIG. 28B, showing a modified example of the optical fiber sheet of the present invention.

In the above embodiment, the respective optical fibers 502 in the tape-form multicore optical fiber 503 are branched as loose tube optical fiber cores 506 arranged laterally, but as shown in FIG. 29A, the optical fibers 503 may be branched in a two-dimensional arrangement. That is, for example, a twelve-core tape-form multicore optical fiber 503' shown in FIG. 29B, corresponding to FIG. 28B may be branched by laminating in three stages, as shown in FIG. 29A, corresponding to FIG. 28A. The point that the adhesive 512 is filled to inside the ends of the tubes 505, and the tubes 505 are bonded to each other by the adhesive 512 is the same as above.

Figure 30A:
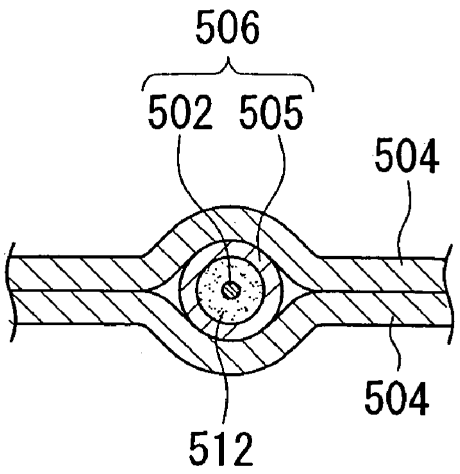
FIG. 30A is a sectional view corresponding to FIG. 28A, showing a modified example of the optical fiber sheet of the present invention.
Figure 30B:
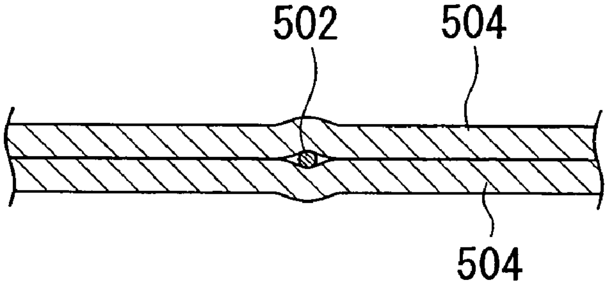
FIG. 30B is a sectional view corresponding to FIG. 28B, showing a modified example of the optical fiber sheet of the present invention.

The present invention is not limited to the case where the multicore optical fiber is branched, and is also applicable to a case of a single core optical fiber. FIG. 30A and FIG. 30B respectively correspond to FIG. 28A and FIG. 28B. In this case, the single core optical fiber 502 arranged inside the sheets 504 is covered with the tube 505, so that the end of the tube 505 is inserted to inside the sheets 504, and is taken out of the sheets 504 as a single core loose tube optical fiber core 506, and an adhesive 512 is filled to inside the end of the tube 505.

Figure 31:
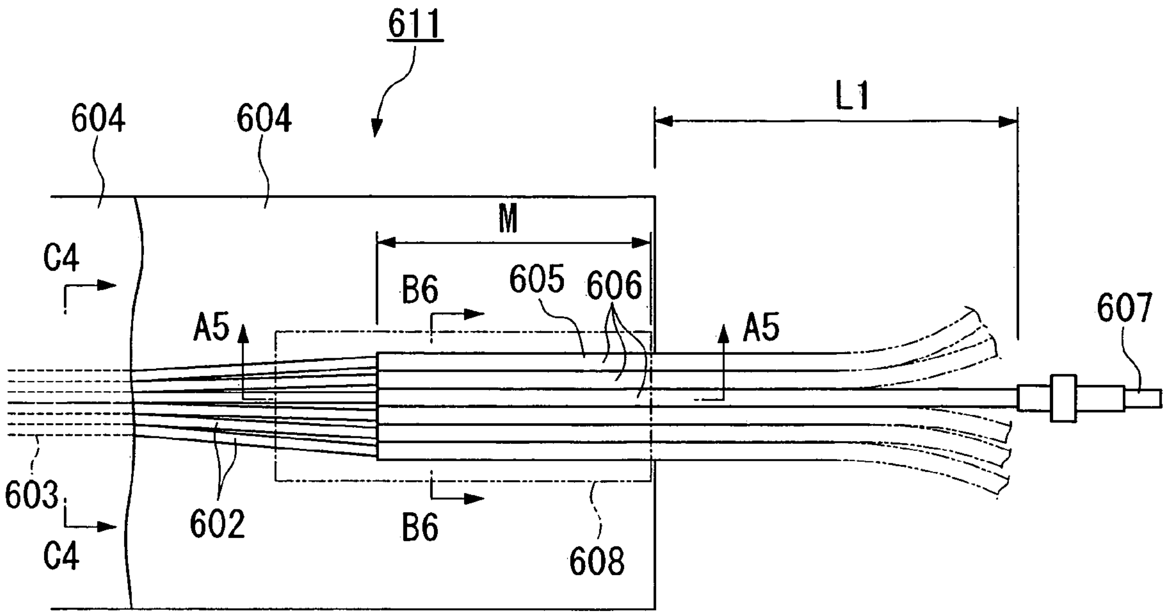
FIG. 31 is a plan view showing another embodiment of the optical fiber sheet, with a part thereof cut away.
Figure 32:
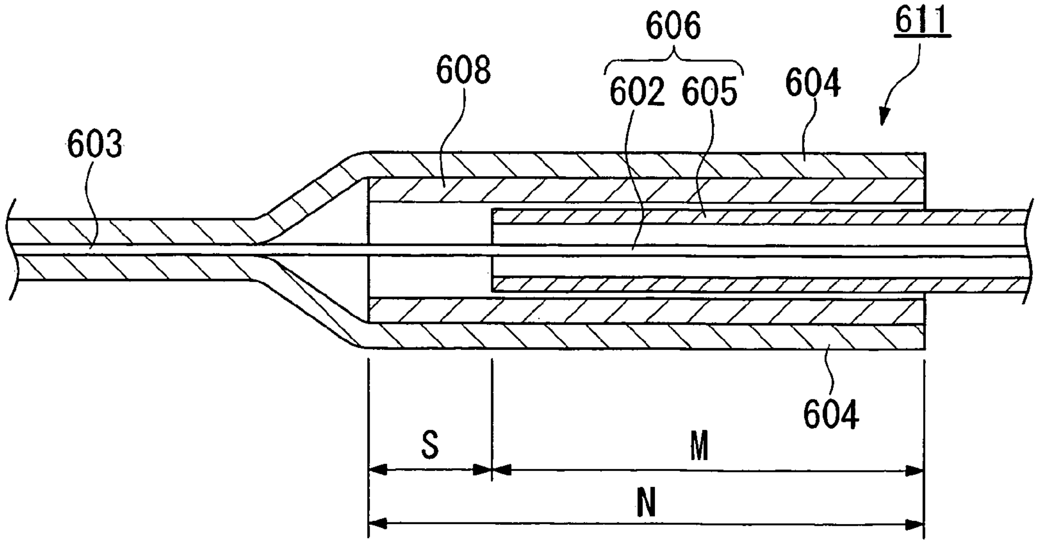
FIG. 32 is an enlarged sectional view along the line A5-A5 in FIG. 31.
Figure 33A:
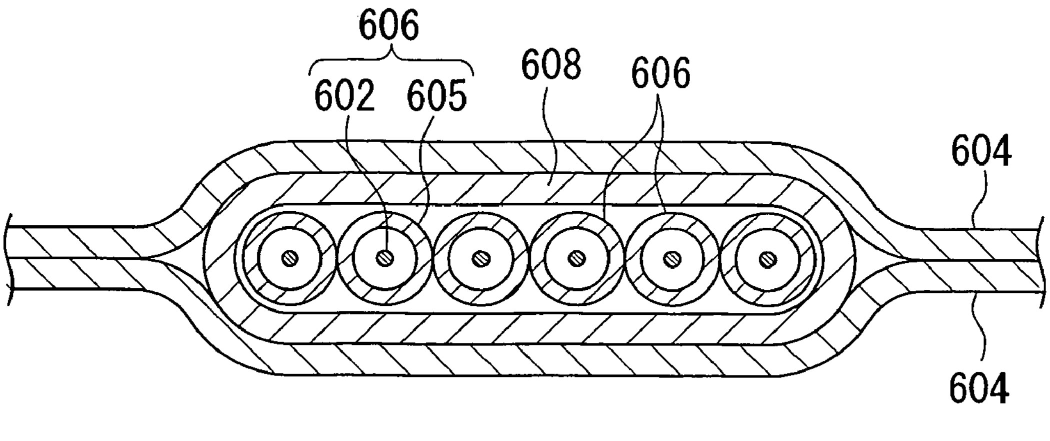
FIG. 33A is a sectional view along the line B6-B6 in FIG. 31.
Figure 33B:
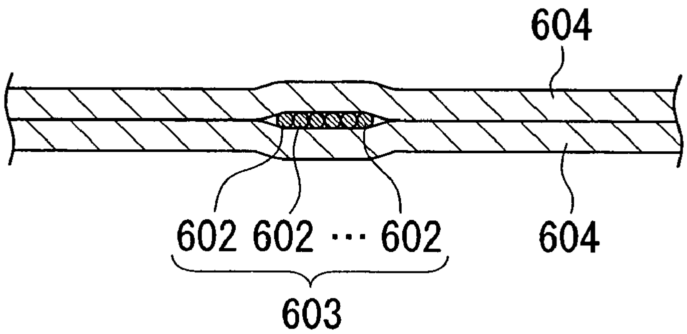
FIG. 33B is a sectional view along the line C4-C4 in FIG. 31.

FIG. 31 is a plan view showing another embodiment of the optical fiber sheet of the present invention, with a part thereof cut away, FIG. 32 is an enlarged sectional view along the line A5-A5 in FIG. 31, FIG. 33A is a sectional view along the line B6-B6 in FIG. 31, and FIG. 33B is a sectional view along the line C4-C4 in FIG. 31.

The optical fiber sheet 611 in this embodiment is constructed such that a tape-form multicore optical fiber 603 obtained by forming a plurality of optical fibers 602 in tape form is arranged between sheets 604 located up and below, each of the optical fibers 602 is covered via a gap with a tube 605 whose front end is inserted to inside the sheets 604, and these optical fibers 602 are branched respectively as single core loose tube optical fiber cores 606, and taken out of the sheets 604. Moreover, at the tip of each of the branched loose tube optical fiber cores 606, an optical connector 607 is fitted. In the figure, the taken out length L1 of the optical connector 507 is shown short, but normally the taken out length L1 is, for example, 1 to 2 m.

In this optical fiber sheet 611, at least the portion of the tube 605 located inside the sheets 604 (the portion indicated by the length M in FIG. 31 and FIG. 32) is made to be a lengthwise unrestrained structure, with lengthwise movement of the tube 605 (movement along the transverse direction in FIG. 31 and FIG. 32) not restrained by the sheets 604 located above and below.

In this embodiment, as the lengthwise unrestrained structure, the portion M of the tube 605 located inside the sheets 604 is covered with a cylindrical member 608 made of resin and having an inner diameter so as not to closely contact with the outer periphery of the tube 605 (that is, having a gap with respect to the outer periphery of the tube 605), and with an appropriate additional length (the dimension corresponding to S in FIG. 32). The material of the cylindrical member 608 is not particularly limited, and for example, a nylon resin or the like can be used. A cold pressure sensitive adhesive of a rubber type or acrylic type is respectively applied to one side of the upper and lower sheets 604, and when the upper and lower sheets 604 are adhered to each other, the cylindrical member 608 is fixed by bonding with the upper and lower sheets 604, together with the respective optical fibers 602. However, since the portion M of the tube 605 inside the sheets is inserted into the cylindrical member 608 via a gap, and does not directly touch the sheets 604 where the adhesive is applied, the lengthwise movement thereof is not restrained by the upper and lower sheets 604.

The cylindrical member 608 fixed by bonding with the upper and lower sheets 604 is normally crushed and becomes a flat shape.

As the material for the upper and lower sheets 604 and the tube 605, the same material as described above for the sheets 504 and the tube 505 can be used.

In the optical fiber sheet 611 also, since the coefficient of linear expansion of the tube 605 made of resin is large, compared with that of the optical fiber 602 made of glass, extension and contraction of the tube 605 with temperature change is relatively large. Therefore, when a temperature change occurs, the tube 605 extends or contracts with respect to the optical fiber 602. Moreover, since the tip of the tube 605 is fixed to the optical connector 607, the tube 605 on the sheet 6044 side extends or contracts with temperature change. However, since the portion M of the tube 605 inside the sheets is inserted into the cylindrical member 608 via a gap, the movement thereof along the lengthwise direction is not restrained. As a result, the portion M of the tube 605 inside the sheet slides in the lengthwise direction to absorb the extension and contraction of the tube 605, and hence tensile or compressive stress does not occur in the tube 605. Hence, tensile or compressive stress due to the extension and contraction of the tube 605 is not applied to the optical fiber 602.

The length N of the cylindrical member 608 (see FIG. 32) is made sufficient, so that even if the tube 605 expands to the maximum due to a temperature rise, the tube 605 does not protrude past the inner end of the cylindrical member 608. The length M of the tube 605 inside the sheets may be longer than normal, so that even under a condition where the tube 605 contracts to a maximum due to a temperature drop, or the tube 605 is pulled, the tube 605 does not come out from the sheets 604. As a result, even if the tube 605 expands or contracts in any manner due to a temperature change or the like, the portion M of the tube 605 inside the sheets can maintain the state inserted into the cylindrical member 608. Moreover, if the tube 605 is pulled, the tube 605 does not come out from the edge of the sheets 604.

Figure 34:
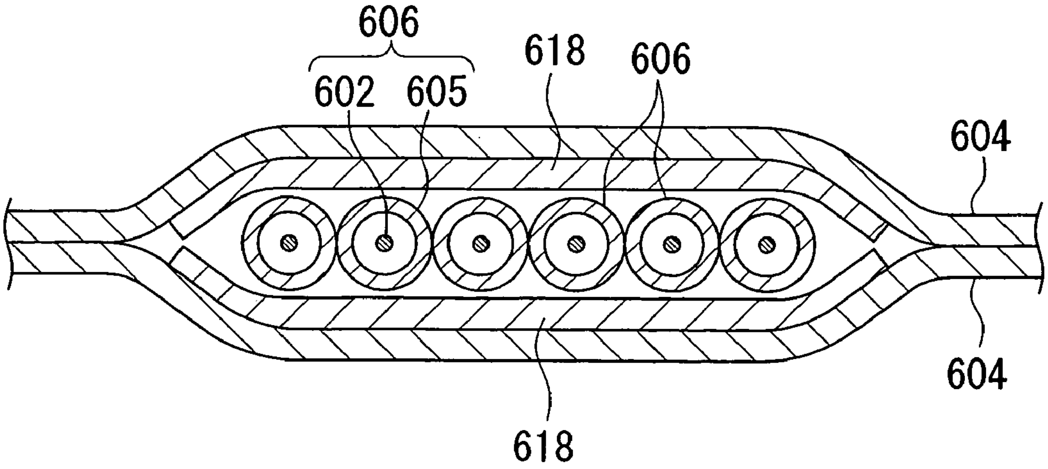
FIG. 34 is a sectional view corresponding to FIG. 33A, showing a modified example of the optical fiber sheet of the present invention.

In this embodiment, as the lengthwise unrestrained structure of the portion M of the tube 605 inside the sheets, the tube 605 is covered with the cylindrical member 608 made of resin. However, as shown in FIG. 34 corresponding to FIG. 33A, the lengthwise unrestrained structure may be formed by dividing the cylindrical member made of resin into halves, and placing the pair of half cut pieces 618 over the tube 605 located inside the sheets, from above and below. The respective upper and lower half cut pieces 618 are fixed by bonding to the upper and lower sheets 604, respectively, but movement of the tube 605 along the lengthwise direction between the upper and lower half cut pieces 618 is not restrained by the upper and lower sheets 604.

Moreover, it can also be considered to adhere a thin film on each inner surface of the sheets 604 within the range corresponding to the portion M of the tube 605 inside the sheets, to cover the adhesive applied to the inner surface of the sheets 604 with this film, so that the tube 605 is not fixed to the sheets 604 by bonding. Alternatively, it can be also considered to not apply adhesive to the inner surface of the sheets 604 within the range corresponding to the portion M of the tube 605 inside the sheets. In other words, any construction may be used, so long as the lengthwise movement of the tube 605 inside the sheets 604 is not restrained by the upper and lower sheets 604.

Figure 35A:
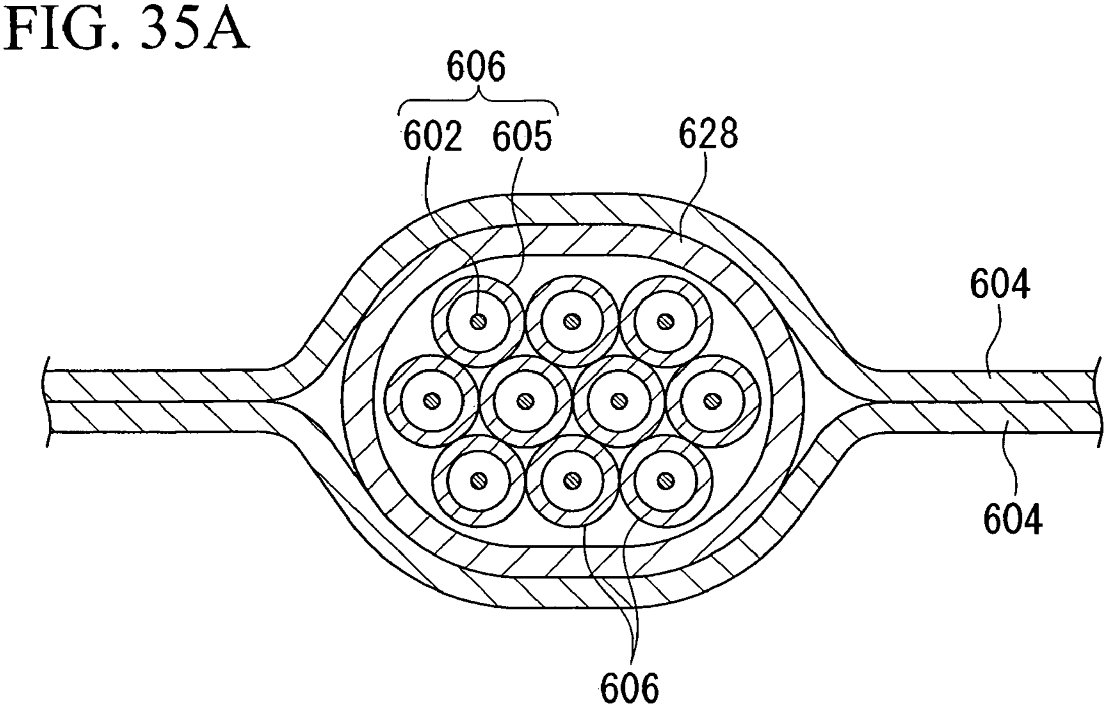
FIG. 35A is a sectional view corresponding to FIG. 33A, showing a modified example of the optical fiber sheet of the present invention.
Figure 35B:
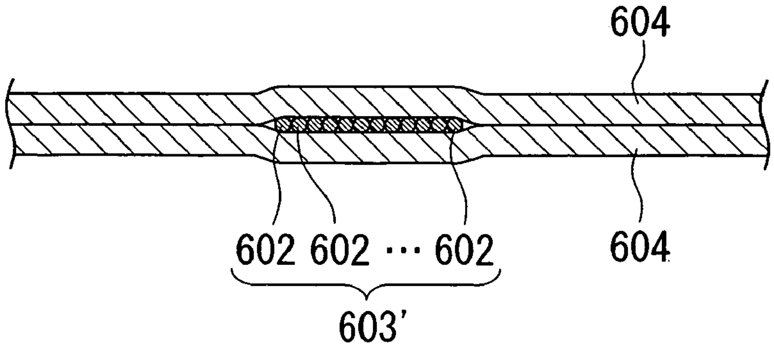
FIG. 35B is a sectional view corresponding to FIG. 33B, showing a modified example of the optical fiber sheet of the present invention.

In this embodiment, the respective optical fibers 602 in the tape-form multicore optical fiber 603 are branched as laterally arranged loose tube optical fiber cores 606. However, it is also possible to branch the optical fibers in a two-dimensional arrangement, as shown in FIG. 35A. In other words, for example, a tape-form multicore optical fiber 603' shown in FIG. 35B corresponding to FIG. 33B may be laminated in three stages and branched, as shown in FIG. 35A corresponding to FIG. 33A. In this case, the portions of the tubes 605 inside the sheets laminated in three stages are covered with, for example, a cylindrical member 628, to form the lengthwise unrestrained structure.

In the respective embodiments, the portions of the respective tubes 605 inside the sheets may be simply aligned, or may be integrated by bonding the adjacent tubes with an adhesive. In this case, since the portions of the respective tubes 605 inside the sheets are bonded with the adhesive, this is not suitable when the extension and contraction amount of the respective tubes 605 is different. However, normally the respective tubes 605 extend or contract uniformly, with respect to a change in environment such as a temperature change. Therefore, under a normal use conditions, this can be used as a construction for not applying a stress to the optical fiber 602.

Figure 36A:
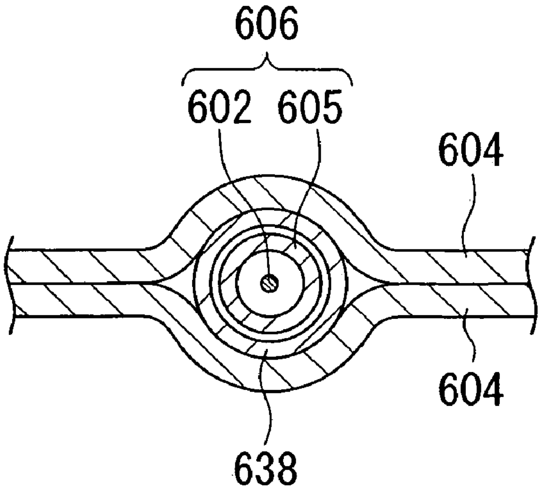
FIG. 36A is a sectional view corresponding to FIG. 33A, showing a modified example of the optical fiber sheet of the present invention.
Figure 36B:
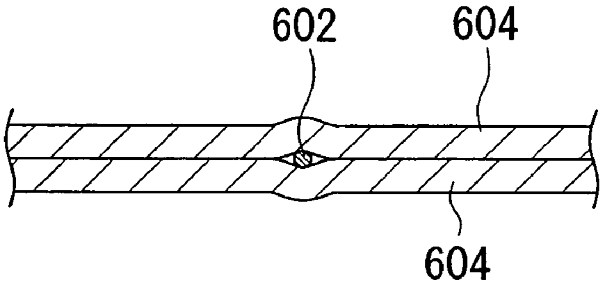
FIG. 36B is a sectional view corresponding to FIG. 33B, showing a modified example of the optical fiber sheet of the present invention.

The present invention is not limited to the case where the multicore optical fiber is branched, and is also applicable to a case of a single core optical fiber. FIG. 36A and FIG. 36B respectively correspond to FIG. 33A and FIG. 33B. In this case, the single core optical fiber 602 arranged inside the sheets 604 is covered with the tube 605, so that the end of the tube 605 is inserted to inside the sheets 604, and is taken out of the sheets 604 as a single core loose tube optical fiber core 606. The portion of the tube 605 inside the sheets is covered with, for example, the cylindrical member 638, to form the lengthwise unrestrained structure.

The respective embodiments described above are particularly effective when the optical connector 507 or 607 is fitted to the tip of the loose tube optical fiber core 506 or 606, but it is not always necessary for the optical connector to be connected thereto.

Another embodiment of the present invention will be described, with reference FIG. 37 to FIG. 43.

Figure 37:
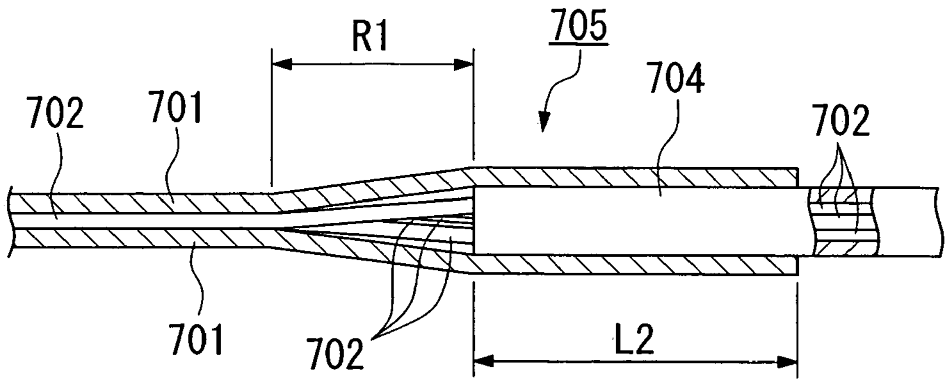
FIG. 37 is a sectional view showing the vicinity of the end of the optical fiber sheet, to which the embodiment of the present invention is applied.

In an optical fiber sheet in which an optical fiber is laid out inside two adhered sheets made of a synthetic resin, as shown in FIG. 37, when a plurality of single core optical fibers 702 are laid out inside the sheets 701, the optical fibers 702 may be laid out, arranged in a tape form (that is, arranged in parallel), so that the optical fibers 702 do not overlap each other. Moreover, when the plurality of optical fibers 702 arranged in tape form are passed through a reinforcing tube 704 from inside the sheets 701 and taken out of the sheets 701, then in such a type of optical fiber sheet 705, as shown in FIG. 37, the reinforcing tube 704 placed over the plurality of optical fibers 702 is simply inserted to inside the sheets 701. The length of the reinforcing tube 704 inserted to inside the sheets 701 is indicated by L2.

When this optical fiber sheet 705 is prepared, if the width W of the tape of the plurality of optical fibers 702 arranged in tape form is wide, the tape may not enter the reinforcing tube 704 as it is, and the optical fibers 702 may be formed in a bundle in the stage prior to entering the reinforcing tube 704. In this case, in a conversion zone between the tape-form arrangement and the bundle-form arrangement (in the zone indicated by arrow R1 in FIG. 37), a complicated change in array occurs. As a result, bending exceeding an allowable bending radius occurs in the optical fiber due not to the natural rigidity thereof but to external forces, and hence bending losses may increase.

In other words, this embodiment is for providing an optical fiber sheet and a manufacturing method therefor, whereby a plurality of optical fibers arranged in tape form inside the sheets can be passed through the reinforcing tube, by converting from tape form to a bundled state with a natural change in array inside the sheets.

Figure 38:
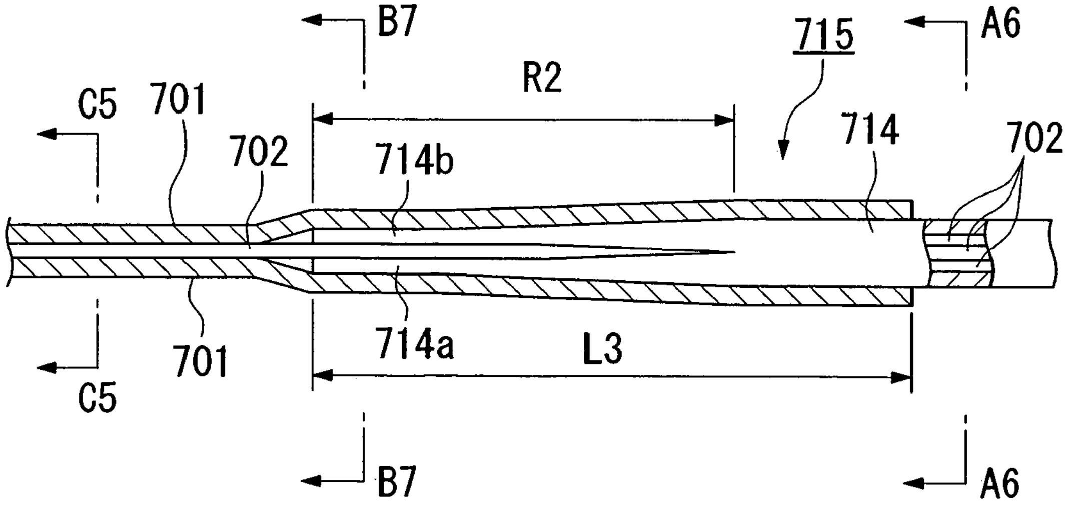
FIG. 38 is a sectional view in the vicinity of the end of the optical fiber sheet, showing another embodiment of the present invention.
Figure 39:
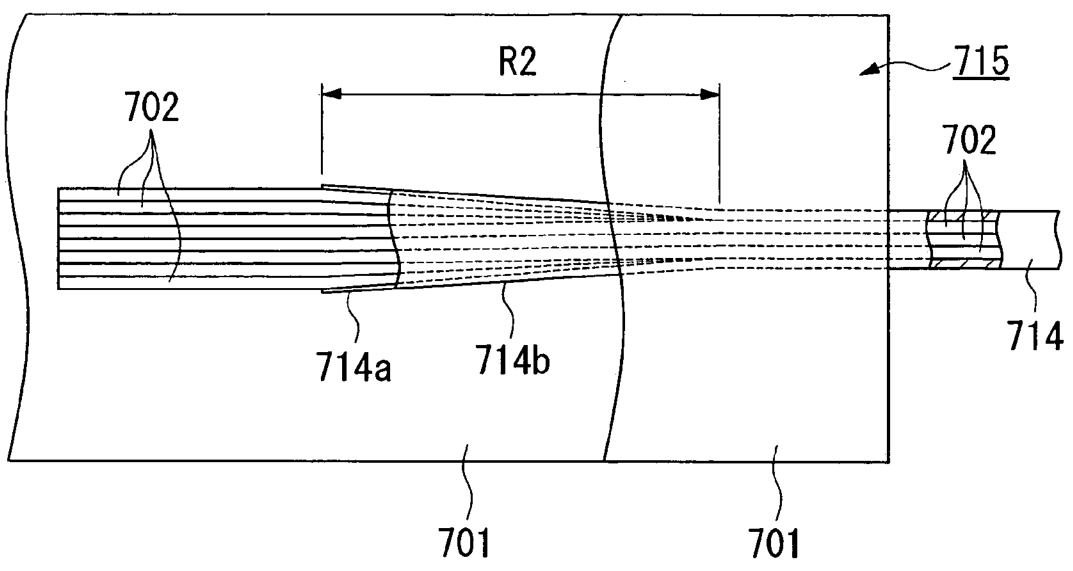
FIG. 39 is a plan view, with a part of the optical fiber sheet shown in FIG. 38 cut away.
Figure 40:
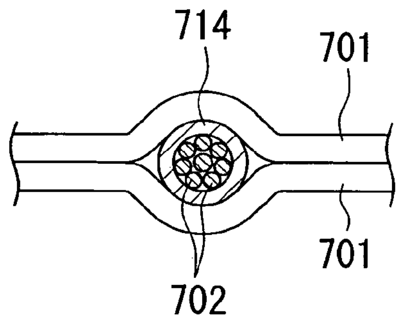
FIG. 40 is a sectional view along the line A6-A6 in FIG. 38.
Figure 41:
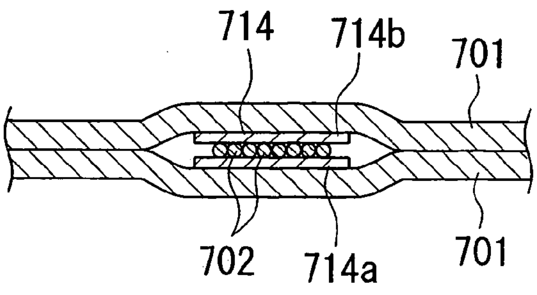
FIG. 41 is a sectional view along the line B7-B7 in FIG. 38.
Figure 42:
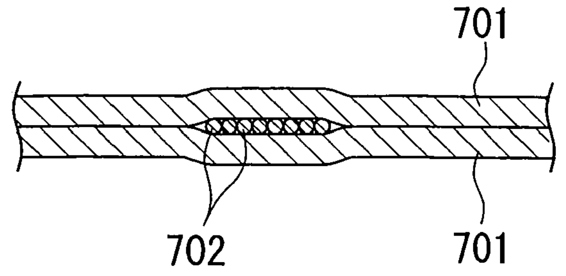
FIG. 42 is a sectional view along the line C5-C5 in FIG. 38.
Figure 43:
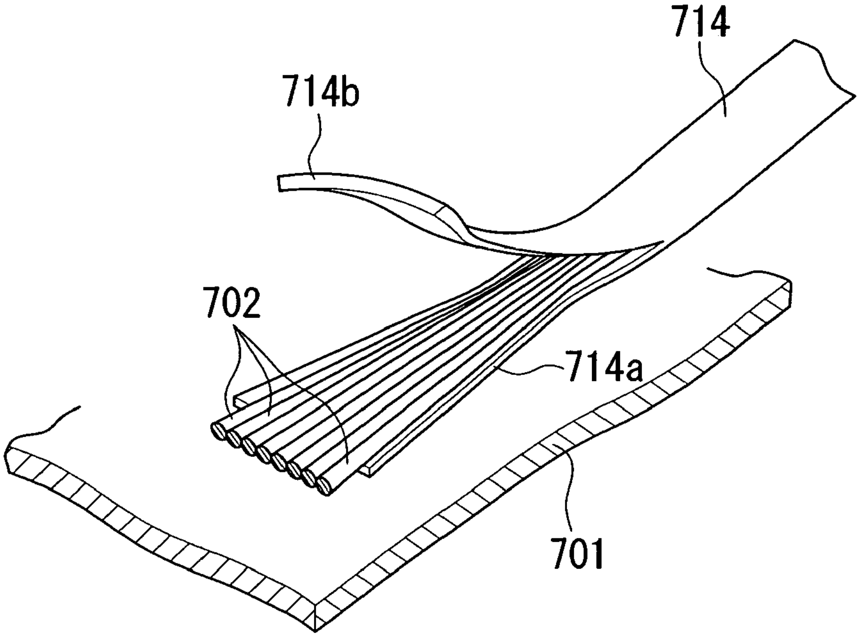
FIG. 43 is a perspective view in the vicinity of the end of the optical fiber sheet, at an intermediate stage in manufacturing the optical fiber sheet.
Figure 44A:
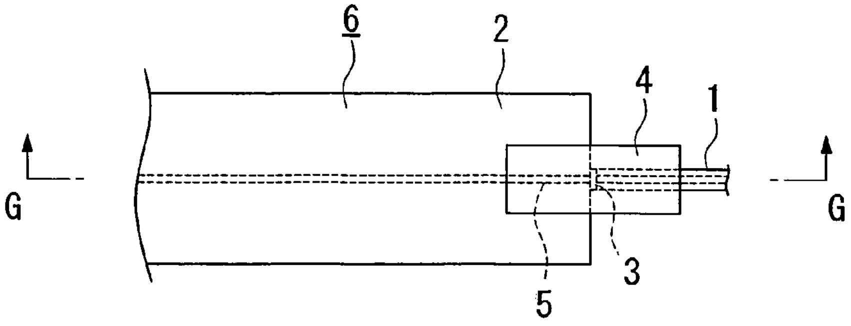
FIG. 44A is a plan view of the end portion of an optical fiber sheet, showing an example of a conventional optical fiber sheet.
Figure 44B:
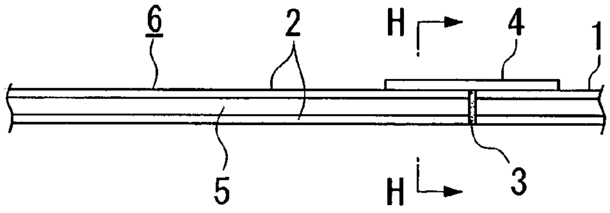
FIG. 44B is a sectional view along the line G-G in FIG. 44A.
Figure 44C:
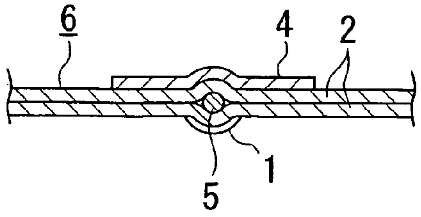
FIG. 44C is a sectional view along the line H-H in FIG. 44B.

FIG. 38 is a sectional view in the vicinity of the end of the optical fiber sheet, showing one example of such an optical fiber sheet, FIG. 39 is a plan view, with a part of the optical fiber sheet shown in FIG. 38 cut away, FIG. 40 is a sectional view along the line A6-A6 in FIG. 38, FIG. 41 is a sectional view along the line B7-B7 in FIG. 38, and FIG. 42 is a sectional view along the line C5-C5 in FIG. 38. FIG. 43 is a perspective view in the vicinity of the end of the optical fiber sheet, at an intermediate stage in manufacturing the optical fiber sheet.

As shown in these figures, in this optical fiber sheet 715, a plurality of single core optical fibers 702 are arranged in tape form, that is, in parallel between the upper and lower adhered two sheets 701. The plurality of optical fibers arranged in tape form (8-core optical fiber) is taken out from inside of the sheets 701 through a reinforcing tube 714 to outside of the sheets 701.

The material for the optical fiber 702 is optional, but for example, a nylon jacketed fiber applied with nylon coating, or a UV jacketed fiber applied with UV coating is used. For the material of the sheets 701, a soft resin such as polyimide, polyethylene terephthalate (PET), polyethylene, polypropylene, polyester or the like is used. For the material of the reinforcing tube 714, nylon resin, Hytrel (described above) or the like is used.

In this example, the portion of the reinforcing tube 714 on the tip side inserted to inside the sheets 701 is divided into halves. The lower side half cut piece is denoted by 714*a*, and the upper side half cut piece is denoted by 714*b*. The lower side half cut piece 714*a* is adhered on the lower sheet 701, and the arrangement of the optical fibers 702 is converted from a tape form array to a bundle form array, on this half cut piece 714*a*. When shown in cross section, FIG. 40 shows a state where the optical fibers are arranged in bundle form, and FIG. 41 and FIG. 42 show a state where the optical fibers are arranged in tape form. The conversion zone of the optical fibers 702 from the state arranged in tape form to the state arranged in bundle form is indicated by R2. This arrangement state conversion zone R2 roughly corresponds to the length of the half cut pieces 714*a* and 714*b* of the reinforcing tube 714.

The important points in preparing the optical fiber sheet 715 are as follows. That is, a plurality of single core optical fibers 702 is arranged in tape form on the lower sheet 701. In the illustrated example, for example, the case is assumed where one 8-core tape fiber in which eight single core optical fibers 702 are bonded in tape form by an adhesive is laid out. The eight single core optical fibers 702 may be arranged side by side on the sheet 701 with a space, or without a space. An adhesive is applied to the sheet 701, and the respective optical fibers 702 are fixed (strongly bonded to some extent) in a tape form arranged state on the sheet 701. The reinforcing tube 714 with the tip side divided into halves is then placed over the plurality of optical fibers 702 arranged in tape form, until the reinforcing tube 714 overlaps the lower sheet 701, and the half-cut piece 714*a* of the reinforcing tube 714 is flatly adhered to the lower sheet 701 (see FIG. 43). This adhering on the lower sheet 701 is adhesion by the adhesive applied on the sheet 701. At this time, so that the half cut portion 714*a* is sufficiently long, the length L3 of the reinforcing tube 714 overlapping the lower sheet 701 (that is, the length inserted between the sheets 701 located up and below) is made longer than the above length L2 (see FIG. 37).

Next, on the half cut piece 714*a* flatly adhered on the lower sheet 701, the array of the optical fibers 702 is converted from tape form (see FIG. 41) to bundle form (see FIG. 40). In other words, in the illustrated example, the tip of the eight-core tape fiber is taken apart one by one, so that the eight single core optical fibers are converted to bundle form. Alternatively, the eight single core optical fibers are converted not to single core optical fibers but to ones having less cores than the optical fibers on the sheet side. In the arrangement state conversion zone R2, the individual optical fibers 702 are placed on the half cut piece 714*a* where the adhesive is not applied, and are not directly fixed on the sheet 701 applied with the adhesive. As a result, the optical fibers 702 arranged in tape form can be converted to a bundle form array, by a gradual natural change in the arrangement state.

Next the upper half cut piece 714*b* is covered over the arrangement state conversion zone R2 of the optical fibers 702, and the upper sheet 701 is then adhered, to thereby obtain the optical fiber sheet 715 as shown in FIG. 38 and FIG. 39. In this manner, the arrangement state conversion zone R2 of the optical fibers 702 is not directly fixed to the upper sheet 701, due to the existence of the upper half cut piece 714*b*. As a result, a natural arrangement state transition can be maintained, without disturbing the arrangement state.

Moreover, even if an external force is applied to the end of the sheets 701, since the respective optical fibers 702 in the arrangement state conversion zone R2 are not restrained by the sheets 701, they are not bent together with the sheets 701. In other words, bending of the respective optical fibers 702 has a degree of freedom within an allowable range, due to gaps and the like inside the reinforcing tube 714.

The portion of the optical fibers 702 arranged in tape form before passing through the reinforcing tube 714, does not always need to be in tape form (parallel state) for a long distance, it being only necessary that the optical fibers are roughly arranged in tape form at the stage before entering the reinforcing tube 714.

As described above, the optical fiber (an optical fiber arranged as an optical fiber sheet) applicable to the present invention includes a single core optical fiber and a multicore optical fiber. In addition, an optical fiber in tape form in which a single core optical fiber and a multicore optical fiber coexist and are covered is also applicable to the present invention. For example, in the respective embodiments, it is also possible to use a multicore optical fiber or an optical fiber in which a single core optical fiber and a multicore optical fiber coexist, instead of using the single core optical fiber (and vice versa). Actually, various types of optical fiber sheets having the features of the present invention exist, corresponding to the specification of the arranged optical fibers.

Moreover, the optical connector connected to the optical fiber includes various types, according to the number of cores of the optical fiber. For example, the optical connector for single core optical fibers includes the known SC type optical connector ferrule, and the MU type optical connector ferrule having a smaller diameter. For the housing accommodating these optical connector ferrules, known SC type, ST type, FC type and LC type housings are preferably used. On the other hand, the optical connector for multicore optical fibers includes the known MT type optical connector ferrule and the (mini-) MT-type optical connector ferrule having a smaller diameter. For the housing accommodating these optical connector ferrules, known MPO type, MT-RJ type (mini-MT type) housings are used. However, the kinds of these optical connectors and housings are only general, and of course various optical connectors and housings having other structures and names can be used. In other words, the optical connector applicable to the optical fiber sheet of the present invention is a general term for a member connected to the tip of the optical fiber for enabling optical connection with other optical fibers, optical guided wave paths, optical devices and optical parts, and is not limited to the optical connector disclosed in the embodiments.

The invention claimed is:

1. An optical fiber sheet obtained by adhering together at least two sheets with an optical fiber placed therebetween, and placing a reinforcing tube over a portion of the optical fiber extending from an edge of the at least two sheets, wherein said reinforcing tube is fixed to the at least two sheets by bonding, with a portion of the reinforcing tube inserted between the at least two sheets located above and below by a distance from the edge of the sheets, wherein an end of the reinforcing tube inserted between the at least two sheets is split into an upper part and a lower part and flattened and adhered to the at least two sheets.

2. An optical fiber sheet according to claim 1, wherein a length of the the upper part is different than a length of the lower part.

3. An optical fiber sheet obtained by adhering together at least two sheets with an optical fiber placed therebetween, and placing a reinforcing tube over a portion of the optical fiber extending from an edge of the sheets, wherein an end of said reinforcing tube is split into an upper part and a lower part, one part thereof is inserted between the sheets, and the other part is placed between the external surface of the sheet and a reinforcing sheet prepared separately and fixed by bonding.

4. An optical fiber sheet obtained by adhering together at least two sheets with an optical fiber place therebetween, and placing a reinforcing tube over a portion of the optical fiber extending from an edge of the sheets, wherein said reinforcing tube is fixed to the sheets by bonding, with the reinforcing tube inserted between the sheets located above and below by a distance, wherein the end of the reinforcing tube inserted between the sheets is split into at least three portions, and flattened, and adhered to the sheets.

5. An optical fiber sheet constructed by arranging an optical fiber inside one or a plurality of sheets having flexibility, wherein a projected portion is formed at an extension portion of the optical fiber at a rear end of the sheet, and a reinforcing tube having an upper half cut portion and a lower half cut portion formed therein by making a slit at a front end is placed over said optical fiber extending from the projected portion, so that the upper half cut portion and the lower half cut portion s place the sheet therebetween from above and below.

6. An optical fiber sheet according to claim 5, wherein a width of said projected portion is set to be not larger than an inner diameter of said reinforcing tube, and said projected portion is accommodated inside a cylindrical portion of said reinforcing tube.

7. An optical fiber sheet according to claim 5, wherein the length of the upper half cut portion and the lower half cut portion is different.

8. An optical fiber sheet constructed by placing an optical fiber between a plurality of sheets and fixing it by bonding, or embedding the optical fiber in a resin constituting the sheet, wherein a reinforcing tube having an upper half cut portion and a lower half cut portion is formed therein by making a slit at a front end is placed over the optical fiber from the rear of the sheet, so that the half cut portions place the sheet therebetween from above and below, and at least one upper reinforcing sheet and at least one lower reinforcing sheet are respectively adhered on the upper and lower faces of the sheet, so as to cover the half cut portions.

9. An optical fiber sheet according to claim 8, wherein the positions of front edges of said at least one upper reinforcing sheet and said at least one lower reinforcing sheet are deviated fore and aft.

10. An optical fiber sheet according to claim 8, wherein front edges of said at least one upper reinforcing sheet and said at least one lower reinforcing sheet are extended forward from front edges of said half cut portions.

11. An optical fiber sheet according to claim 8, wherein rear edges of said at least one upper reinforcing sheet and said at least one lower reinforcing sheet are extended rearward from rear edges of said sheet.

12. An optical fiber sheet in which a front end of an optical fiber cord accommodating an optical fiber in a reinforcing tube together with tensile strength strands, and said optical fiber exposed from a front end of said optical fiber cord are placed between an upper sheet and a lower sheet and fixed, wherein a supplementary sheet is adhered on said optical fiber arranged on said sheet located below, said tensile strength strands exposed from said reinforcing tube are arranged on the supplementary sheet, and said lower sheet is adhered on said tensile strength strands.

13. An optical fiber sheet according to claim 12, wherein a front end of said reinforcing tube is also placed between said upper sheet and said lower sheet and fixed.

14. An optical fiber sheet according to claim 12, further comprising an adhesive layer, in which said tensile strength strands are embedded, formed between a rear end of said supplementary sheet and a front end of said reinforcing tube which is arranged away from said supplementary sheet, and said optical fiber located between said supplementary sheet and said reinforcing tube is embedded and fixed in the adhesive layer.

15. An optical fiber sheet in which a plurality of single core loose tube optical fiber cores formed by placing a tube over each optical fiber of a tape-form multicore optical fiber arranged inside the sheet via a gap is taken out from the inside of an edge portion of said sheet to the outside of said sheet, wherein an adhesive is filled into an end of said respective tubes inserted into said sheet, and wherein said loose tube optical fiber cores are branched in a two-dimensional arrangement.

16. An optical fiber sheet obtained by placing two sheets together in which a single core loose tube optical fiber core formed by placing a tube over an optical fiber arranged inside the optical fiber sheet via a gap is taken out from the inside of an edge portion of said optical fiber sheet to outside of said optical fiber sheet, wherein a portion of said tube located inside said optical fiber sheet has a lengthwise unrestrained structure, in which movement along the lengthwise direction of the tube is not restrained by said two sheets located above and below.

17. An optical fiber sheet according to claim 16, wherein said lengthwise unrestrained structure is constructed by placing a cylindrical member made of resin, having an inner diameter largerthan an outer peripheral face of said tube, over a portion of said tube located at least inside said optical fiber sheet.

18. An optical fiber sheet according to claim 16, wherein said lengthwise unrestrained structure is constructed by placing a pair of half cut pieces obtained by dividing a cylindrical member made of resin into halves over a portion of said tube located at least inside said optical fiber sheet.

19. An optical fiber sheet according to claim 16, wherein an optical connector is fitted to the tip of said loose tube optical fiber core.

20. An optical fiber sheet obtained by placing two sheets together in which a plurality of single core loose tube optical fiber cores formed by placing a tube over each optical fiber of a tape-form multicore optical fiber arranged inside the optical fiber sheet via a gap is taken out from the inside of an edge portion of said optical fiber sheet to outside of said optical fiber sheet, wherein a portion of said tubes located inside said optical fiber sheet has a lengthwise unrestrained structure, in which movement along the lengthwise direction of the tubes is not restrained by said two sheets located above and below.

21. An optical fiber sheet according to claim 20, wherein said lengthwise unrestrained structure is constructed by placing cylindrical members made of resin, having an inner diameter largerthan an outer peripheral face of said tube, over portion of said tubes located at least inside said optical fiber sheet.

22. An optical fiber sheet according to claim 20, wherein said lengthwise unrestrained structure is constructed by placing pairs of half cut pieces obtained by dividing a cylindrical member made of resin into halves over portions of said tubes located at least inside said sheet.

23. An optical fiber sheet according to claim 20, wherein optical connectors are fitted to the tips of said loose tube optical fiber cores.

24. An optical fiber sheet according to claim 20, wherein said loose tube optical fiber cores are branched in a two-dimensional arrangement.

25. An optical fiber sheet in which a plurality of single core optical fibers is arranged in a tape form inside a minimum of two adhered sheets, and said plurality of optical fibers arranged in tape form is taken out from the inside of the adhered sheets to the outside of the adhered sheets by passing the optical fibers through a reinforcing tube, wherein a front end portion of said reinforcing tube inside the adhered sheets is divided at least into halves, with one of the half cut pieces being adhered on one of said adhered sheets which is located below said reinforcing tube, and the arrangement of said optical fibers being converted from tape form to a bundle form on said half cut piece.

26. A manufacturing method for an optical fiber sheet comprising:

arranging a plurality of single core optical fibers in a tape form on a lower side sheet;

placing a reinforcing tube, with a front end divided into halves, over a plurality of optical fibers arranged in a tape form, until the reinforcing tube overlaps on said lower side sheet, and adhering said half cut piece of said reinforcing tube located below said optical fibers to said lower side sheet;

converting the arrangement of said optical fibers from the tape form to a bundle form, on said half cut piece;

placing said half cut piece located above over an arrangement state conversion portion of said optical fiber; and adhering said sheet located above said optical fiber to to the arrangement state conversion portion.

* * * * *